United States Patent
Kogetsu et al.

(10) Patent No.: US 7,794,878 B2
(45) Date of Patent: Sep. 14, 2010

(54) NEGATIVE ELECTRODE FOR LITHIUM SECONDARY BATTERY AND LITHIUM SECONDARY BATTERY USING THE NEGATIVE ELECTRODE

(75) Inventors: Yasutaka Kogetsu, Osaka (JP); Masaya Ugaji, Osaka (JP)

(73) Assignee: Panasonic Corporation, Osaka (JP)

( * ) Notice: Subject to any disclaimer, the term of this patent is extended or adjusted under 35 U.S.C. 154(b) by 655 days.

(21) Appl. No.: 11/654,667

(22) Filed: Jan. 18, 2007

(65) Prior Publication Data

US 2007/0166613 A1   Jul. 19, 2007

(30) Foreign Application Priority Data

Jan. 19, 2006   (JP) .............................. 2006-011239

(51) Int. Cl.
- H01M 4/58 (2010.01)
- H01M 4/02 (2006.01)
- H01M 4/64 (2006.01)
- H01M 4/82 (2006.01)

(52) U.S. Cl. ............... 429/218.1; 429/209; 429/231.95; 429/233; 29/623.1; 29/623.5

(58) Field of Classification Search ................. 429/209, 429/218.1, 220, 223, 226, 231.5, 231.95, 429/245; 427/58, 78; 205/58–60
See application file for complete search history.

(56) References Cited

U.S. PATENT DOCUMENTS

| | | | |
|---|---|---|---|
| 5,494,762 A | 2/1996 | Isoyama et al. | |
| 5,866,204 A | 2/1999 | Robbie et al. | |
| 6,248,422 B1 | 6/2001 | Robbie et al. | |
| 6,649,033 B2 | 11/2003 | Yagi et al. | |
| 6,800,400 B2 | 10/2004 | Ota et al. | |
| 6,887,623 B2 | 5/2005 | Fujimoto et al. | |
| 7,192,673 B1 * | 3/2007 | Ikeda et al. | 429/209 |

(Continued)

FOREIGN PATENT DOCUMENTS

EP   1 231 653 A1   8/2002

(Continued)

OTHER PUBLICATIONS

Robbie et al. ("Advanced Techniques for Glancing Angle Deposition," Journal Vac. Sci. Technol. B, May/Jun. 1998, 16(3), pp. 1115-1122).*

(Continued)

Primary Examiner—Dah-Wei D Yuan
Assistant Examiner—Claire L Rademaker
(74) Attorney, Agent, or Firm—McDermott Will & Emery LLP

(57) ABSTRACT

A negative electrode for a lithium secondary battery and a lithium secondary battery including the negative electrode. The negative electrode includes a sheet-like current collector and an active material layer being carried thereon and including silicon atom. The active material layer includes a plurality of columnar particles, and in each columnar particle, at least a portion forming the columnar particle is grown to tilt with respect to the direction normal to the current collector. In the thickness direction of the active material layer, porosity $P_c$ of the current collector side lower half of the active material layer and porosity $P_s$ of the surface side upper half of the active material layer satisfy $P_c < P_s$.

8 Claims, 4 Drawing Sheets

U.S. PATENT DOCUMENTS

| | | |
|---|---|---|
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 2004/0241548 A1 | 12/2004 | Nakamoto et al. |
| 2005/0048369 A1 | 3/2005 | Koshina et al. |
| 2005/0095506 A1 | 5/2005 | Klaassen |
| 2005/0153208 A1 | 7/2005 | Konishiike et al. |
| 2006/0024586 A1 | 2/2006 | Tamura et al. |
| 2007/0059601 A1 | 3/2007 | Natsume et al. |
| 2007/0207386 A1* | 9/2007 | Konishiike et al. .......... 429/232 |

FOREIGN PATENT DOCUMENTS

| | | |
|---|---|---|
| EP | 1 231 654 A1 | 8/2002 |
| EP | 1 246 278 A1 | 10/2002 |
| EP | 1 912 270 A | 4/2008 |
| JP | 05-249299 | 9/1993 |
| JP | 06-187994 | 7/1994 |
| JP | 06-290782 | 10/1994 |
| JP | 9-213366 | 8/1997 |
| JP | 2001-502013 | 2/2001 |
| JP | 2002-170482 | 6/2002 |
| JP | 2002-170557 | 6/2002 |
| JP | 2003-17040 | 1/2003 |
| JP | 2003-077463 | 3/2003 |
| JP | 2003-187806 | 7/2003 |
| JP | 2003-303586 A | 10/2003 |
| JP | 2004-031217 | 1/2004 |
| JP | 2004-127561 A | 4/2004 |
| JP | 2004-296103 | 10/2004 |
| JP | 2004-319469 | 11/2004 |
| JP | 2005-11725 | 1/2005 |
| JP | 2005-100959 | 4/2005 |
| JP | 2005-108523 | 4/2005 |
| JP | 2005-141992 | 6/2005 |
| JP | 2005-196970 | 7/2005 |
| JP | 2005-235397 | 9/2005 |
| JP | 2006-172973 | 6/2006 |
| JP | 2006-196447 | 7/2006 |
| KR | 10-2005-021892 | 7/2005 |
| RU | 2099819 C1 | 12/1997 |
| WO | WO 2004/049476 A1 | 6/2004 |
| WO | WO 2004/109839 A1 | 12/2004 |
| WO | WO 2005/008809 A1 | 1/2005 |
| WO | WO 2007/015419 A | 2/2007 |

OTHER PUBLICATIONS

United States Office Action issued in U.S. Appl. No. 11/363,945 dated Jan. 28, 2010.

"Formation of $SiN_x$ film by ion-beam-assisted vapor deposition," Iwase, Kobayashi, Masaki, Morisaki, Proceedong of the School of Engineering of Tokai University, vol. 31, No. 1, 1991, pp. 23-30.

K. C. Mohite et al., "Characterization of silicon oxynitride thin films deposited by electron beam physical vapor deposition technique," Material Letters, vol. 57, 2003, pp. 4170-4175.

M. Molinari et al., "Visible photoluminescence in amorphous $SiN_x$ thin films prepared by reactive evaporation," Applied Physics Letter, vol. 77, No. 22, 2000, pp. 3499-3501.

Nieuwenhuizen, J.M., et al., "Microfractography of thin films", Philips Technical Review, 1966, pp. 87-91, vol. 27.

Shiraki, Y. et al., "Morphological Control of Thin Film," pp. 287-290 and pp. 298-299 with partial English translation thereof.

Robbie K., et al., "Sculptured then films and glancing angle deposition: Growth mechanics and applications," Journal of Vacuum Science and Technology, A 15(3), May/Jun. 1997, p. 1460-01465.

Suzuki M., et al., "Integrated Sculptured Thin Films," Jpn. J. Appl. Phys. vol. 40 (2001) pp. L 358-L 359, Part 2, No. 4A, Apr. 1, 2001.

Messier R. et al., "Engineered sculptured nematic thin films," Journal of Vacuum Science and Technology, A 15(4), Jul./Aug. 1997, p. 2148-2151.

* cited by examiner

NEGATIVE ELECTRODE FOR LITHIUM SECONDARY BATTERY AND LITHIUM SECONDARY BATTERY USING THE NEGATIVE ELECTRODE

FIELD OF THE INVENTION

The present invention relates to a negative electrode for lithium secondary batteries and to a lithium secondary battery using the negative electrode. The negative electrode includes a current collector and an active material layer carried thereon. The active material layer comprises columnar particles. The columnar particles include silicon as a constituent element.

BACKGROUND OF THE INVENTION

With development of portable devices such as personal computers and mobile phones, nowadays, there is an increasing demand for batteries as power sources for these devices. Batteries used for these devices are used at room temperatures, and are required to have a high energy density as well as excellent cycle performance.

For such demands, a battery including simple substance of silicon (Si) or tin (Sn), an oxide of Si or Sn, or an alloy including Si or Sn as the negative electrode active material, which achieves a greatly high capacity, is considered as promising.

However, lithium absorption causes changes in the crystal structure of these materials, leading to a volume increase. The large extent of volume change in the active material upon charging and discharging causes a contact failure between the active material and the current collector, leading to a shortened charge and discharge cycle life.

A negative electrode deformation is also a problem when using such materials as the negative electrode active material. Upon charging and discharging, intercalation and deintercalation of lithium (Li) cause a large degree of expansion and contraction in the negative electrode active material, leading to a large degree of negative electrode distortion and undulating. Thus, gaps are created between the negative electrode and the separator, which causes nonuniform charging and discharging reactions and declines the cycle performance.

For such a problem, there has been proposed that a space is provided in the negative electrode for easing the stress from the active material expansion, to retard the distortion and undulating, and deterioration in cycle performance. For example, Japanese Laid-Open Patent Publication No. 2003-303586 has proposed that columnar particles of silicon are formed on the current collector. Additionally, Japanese Laid-Open Patent Publication No. 2004-127561 has proposed that an active material that forms an alloy with lithium is disposed orderly on the current collector.

In the negative electrode of Japanese Laid-Open Patent Publication No. 2003-303586 and the negative electrode of Japanese Laid-Open Patent Publication No. 2004-127561, columnar negative electrode active material particles that are grown in the direction parallel to the direction normal to the current collector are formed on the sheet-like current collector. Thus, a greater portion of the positive electrode active material layer faces the exposed portion of the negative electrode current collector, rather than facing the negative electrode active material. Therefore, lithium supplied from the positive electrode active material while charging is not absorbed by the negative electrode active material, and easily deposits on the exposed portion of the negative electrode current collector. As a result, while discharging, lithium is not released from the negative electrode effectively, causing a decline in charge and discharge efficiency.

Also, while discharging, because only the portion of the positive electrode active material layer facing the negative electrode active material reacts easily, in addition to the decline in actual discharge capacity, there is a possibility that the positive electrode active material becomes partially overdischarged. Repetitive charge and discharge cycles advance such non-uniform reaction, and the portion of the positive electrode active material that was not discharged easily becomes over-charged. On the other hand, the portion of the positive electrode active material that is in over-discharged state also increases. Thus, the side reaction increases its proportion, the discharge capacity declines, and battery deterioration advances. Especially when charge and discharge are carried out at a high current, the cycle performance drastically declines.

Further, when the columnar particles expand and the adjacent columnar particles contact with each other, a stress is applied to the interface between the columnar particles and the current collector, causing a breakage in the columnar particles, and a separation of the active material from the current collector. This leads to a decrease in current collecting ability and in cycle performance.

BRIEF SUMMARY OF THE INVENTION

The present invention relates to a negative electrode for lithium secondary batteries. The negative electrode includes a sheet-like current collector and an active material layer being carried on the current collector and including silicon atoms. The active material layer includes a plurality of columnar particles, and in each columnar particle, at least a portion of the columnar particle grows to tilt with respect to the direction normal to the current collector. In the thickness direction of the active material layer, porosity Pc of the current collector side lower half of the active material layer and porosity Ps of the surface side upper half of the active material layer satisfy the relation Pc<Ps. The current collector side lower half of the active material layer refers to the part of the active material layer from the center portion to the side contacting the current collector in the thickness direction thereof, and the surface side upper half of the active material layer refers to the part of the active material layer from the center portion to the surface side. The center portion of the active material layer refers to the half of the height from the average line of the current collector for determining the surface roughness (Rz), to the highest point of the columnar particles. The direction normal to the current collector refers to the direction perpendicular to the main flat surface of the current collector. The main flat surface of the current collector is uneven when microscopically observed, but flat when observed with the naked eye. Therefore, the direction normal to the current collector can be uniquely defined.

Porosity Pc is preferably 10 to 60%, and porosity Ps is preferably 20 to 70%. The porosity does not refer to a three-dimensional, spatial volume ratio, but refers to a two-dimensional, a real ratio at a specific cross section of the active material layer. That is, the porosity refers to the a real ratio, of the area obtained by deducting the columnar particle cross sectional area from the active material layer cross sectional area, to the active material layer cross sectional area, at an arbitrary vertical cross section of the active material layer.

Angle θ between the growth direction of the columnar particle and the direction normal to the current collector is preferably increasing from the side contacting the current collector to the surface side of the active material layer. Further, maximum angle θs and minimum angle θc of the angle θ preferably satisfy the following relation:

10°≦θs−θc, 0°≦θc<80°, and 10°≦θs<90°.

A difference of area A and area B, i.e., A−B, is preferably 60% or less, further preferably 30% or less, and particularly preferably 0% of area A, area A being the area of the current collector carrying the active material layer, and area B being the area of the active material layer orthographically projected in the direction normal to the current corrector. Rate S (%) obtained by 100×{(A−B)/A} is referred to as the current collector exposure rate hereinafter. Current collector exposure rate S represents the ratio, of the observable exposed area of the current collector, relative to the area of the region in the current collector where the active material layer is carried, when the active material layer is observed from the direction normal to the current collector.

The columnar particles forming the active material layer preferably comprise, for example, at least one selected from the group consisting of a simple substance of silicon, a silicon alloy, a compound including silicon and oxygen, and a compound including silicon and nitrogen.

Metal element M included in the silicon alloy other than silicon is preferably a metal element that does not form an alloy with lithium. Metal element M is preferably at least one selected from the group consisting of titanium, copper, and nickel.

The compound including silicon and oxygen preferably is represented by the following formula:

where 0<x<2.

The present invention also relates to a lithium secondary battery including a positive electrode capable of absorbing and desorbing lithium ions, the above negative electrode, a separator disposed between the positive electrode and the negative electrode, and a lithium ion-conductive electrolyte.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the following, the present invention is described in detail by referring to the FIGS.

Figure 1:
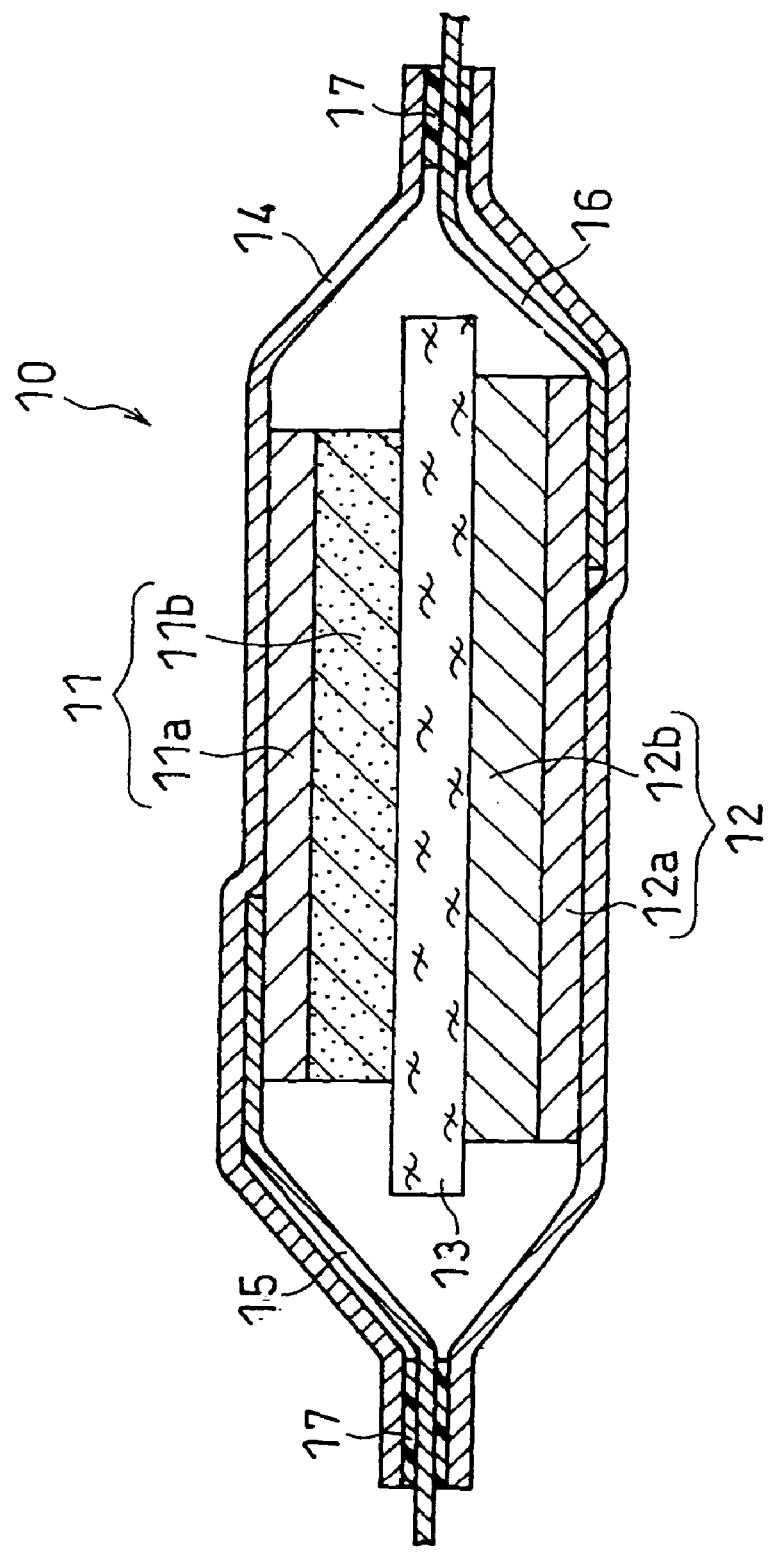
FIG. 1 is a vertical cross section schematically illustrating a lithium secondary battery in one embodiment of the present invention.

FIG. 1 is a vertical cross section schematically illustrating an example of a stacked lithium secondary battery.

A battery 10 includes an electrode assembly including a positive electrode 11, a negative electrode 12, and a separator 13 interposed between the positive electrode and the negative electrode. The electrode assembly and a lithium ion-conductive electrolyte are stored in a battery case 14. The separator 13 is impregnated with the lithium ion-conductive electrolyte. The positive electrode 11 includes a positive electrode current collector 11a, and a positive electrode active material layer 11b carried thereon. The negative electrode 12 includes a negative electrode current collector 12a, and a negative electrode active material layer 12b carried thereon. To the positive electrode current collector 11a and the negative electrode current collector 12a, one end of a positive electrode lead 15 and one end of a negative electrode lead 16 are connected, respectively.

The battery case 14 has openings at positions opposite to each other, and from one opening of the battery case 14, the other end of the positive electrode lead 15 extends to the outside, and from the other opening of the battery case 14, the other end of the negative electrode lead 16 extends to the outside. The openings of the battery case 14 are sealed by using a sealing material 17.

The positive electrode active material layer 11b desorbs lithium when charging, and when discharging, absorbs lithium released from the negative electrode active material layer 12b. The negative electrode active material layer 12b absorbs lithium released by the positive electrode active material when charging, and when discharging, desorbs lithium.

The negative electrode current collector 12a preferably has uneven surface on the side carrying the active material layer. To be more specific, surface roughness Rz (ten point mean roughness) of the current collector surface (that is, main flat surface) is preferably 0.1 to 100 μm, and further preferably 0.1 to 30 μm. A smaller surface roughness Rz may make the provision of spaces between adjacent columnar particles difficult. A greater surface roughness Rz makes the average thickness of the current collector thicker, but when Rz is 100 μm or less, high capacity characteristics of the lithium secondary battery can be fully brought out.

The surface of the negative electrode current collector carrying the active material layer preferably has 100000 to 10000000 bumps per unit area, i.e., 1 cm². Although a greater number of bumps per unit area are advantageous for increasing the number of the columnar particles to be carried per unit area, porosity P of the negative electrode tends to be lower. A small number of bumps per unit area are advantageous for decreasing the number of the columnar particles to be carried per unit area.

For such a current collector, for example, preferably used are an electrolytic copper foil and an electrolytic copper alloy foil, and further, a roughened electrolytic copper foil and a roughened rolled copper foil. The roughening refers to a process in which a copper foil is immersed in a solution for partial chemical etching to give roughness, and a process in which copper particles are electrodeposited on a copper foil to give bumps. Surface roughness Rz can be determined in conformity to JIS B0601-1994, i.e., a method specified by Japanese Industrial Standards (JIS).

The negative electrode active material layer comprises a plurality of the columnar particles. The columnar particles protrude from the current collector. Each columnar particle is grown so that at least a portion forming the columnar particle tilts with respect to the direction normal to the current collector. The columnar particle may be formed of one portion, or may be formed of two or more portions. The columnar particle being formed of two or more portions are described by referring to FIGS. 2 and 3.

Figure 2:
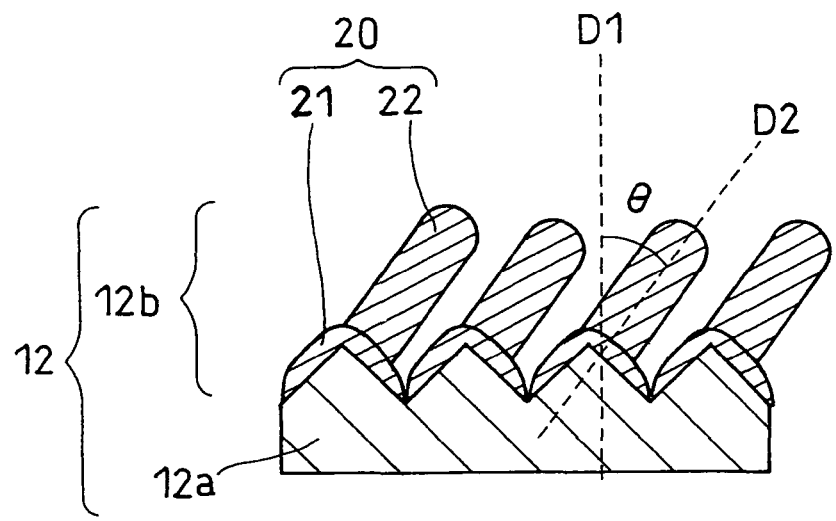
FIG. 2 is a vertical cross section schematically illustrating a structure of a negative electrode for a lithium secondary battery in one embodiment of the present invention.

FIG. 2 is a vertical cross section schematically illustrating a structure of a negative electrode in one embodiment of the present invention. In FIG. 2, the same elements as in FIG. 1 are designated by the same reference numbers.

A negative electrode 12 in FIG. 2 includes a negative electrode current collector 12a with uneven surface, and a negative electrode active material layer 12b carried thereon. The negative electrode active material layer 12b comprises a plurality of columnar particles 20.

The columnar particle 20 includes a first portion 21 and a second portion 22. The first portion 21 is grown perpendicular with respect to direction D1 normal to the current collector 12a. The second portion 22 is grown at angle θ, in direction D2 oblique to direction D1 normal to the current collector 12a. The first portion 21 is grown so that the projections and depressions at the surface of the negative electrode current collector 12a are covered. The second portion 22 is formed on the first portion 21 covering the projections and depressions on the surface, and its radius is smaller compared with the radius of the first portion 21. Therefore, in the thickness direction of the negative electrode active material layer 12b, porosity Ps of the upper half portion, i.e., the surface side, of the negative electrode active material layer is lower compared with porosity Pc of the lower half portion, i.e., the current collector side of the negative electrode active material layer.

Figure 3:
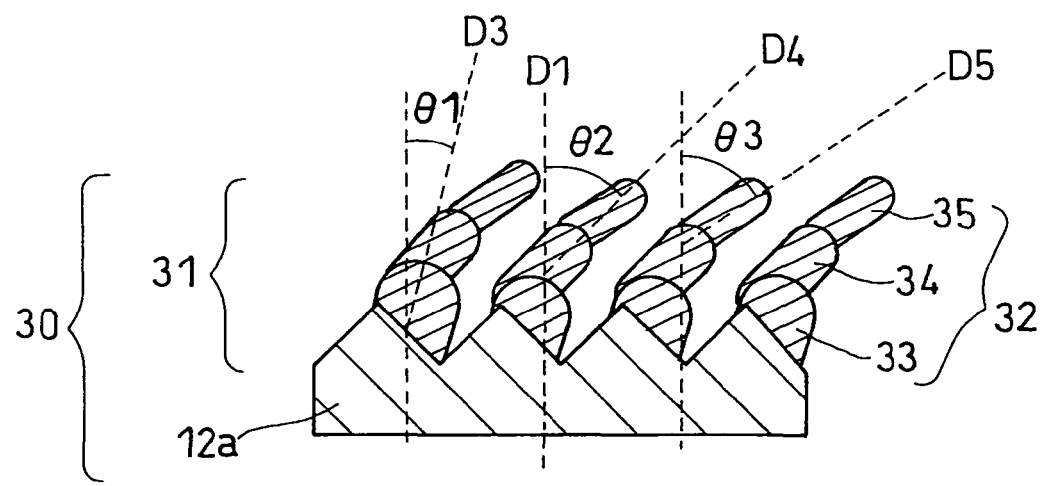
FIG. 3 is a vertical cross section schematically illustrating a structure of a negative electrode for a lithium secondary battery in another embodiment of the present invention.

The negative electrode active material layer may be in the form as shown in FIG. 3. FIG. 3 is a vertical cross section schematically illustrating a structure of a negative electrode in another embodiment of the present invention.

In a negative electrode 30 in FIG. 3, a negative electrode active material layer 31 comprises a plurality of columnar particles 32. The columnar particle 32 includes a first portion 33, a second portion 34, and a third portion 35. The first portion 33, the second portion 34 and the third portion 35 are grown oblique to direction D1 normal to the current collector 12a. When the growth directions of each portion are regarded as D3, D4, and D5, and angles formed between direction D1 normal to the current collector 12a and D3, D4, or D5, are regarded as θ1, θ2, and θ3, respectively, the following relation is satisfied:

θ1<θ2<θ3.

Additionally, the radiuses of the first portion 33, the second portion 34, and the third portion 35 are decreasing in the order mentioned. Therefore, in this case as well, in the thickness direction of the negative electrode active material layer 12b, porosity Ps of the upper half portion of the negative electrode active material layer is lower compared with porosity Pc of the lower half portion of the negative electrode active material layer.

In the case of the columnar particles in FIG. 3, although the growth direction of all the portions tilts with respect to the direction normal to the current collector, at least one growth direction of the first portion 33, the second portion 34, and the third portion 35 may be made oblique to the direction normal to the current collector. For example, the growth direction of at least an outermost portion may be made oblique to the direction normal to the current collector.

By making the growth direction of the columnar particles oblique to the direction normal to the current collector as in the above, the proportion of the exposed portion of the negative electrode current collector in the region where the negative electrode active material layer is carried can be decreased, or the proportion of the exposed portion can be made zero. Therefore, the area where the positive electrode active material and the negative electrode active material face increases, thereby increasing the charge and discharge efficiency, and decreasing the possibility of deposition of lithium on the negative electrode current collector. That is, the non-uniform electrode reaction is curbed, and charge and discharge cycle performance is improved. Especially, a sudden drop in cycle performance observed in the case of high rate charge and discharge at large current can be curbed notably. Additionally, in the case where the growth direction of the columnar particle is made oblique to the direction normal to the current collector, the contact area between the negative electrode active material and the electrolyte increases. Therefore, high rate charge and discharge performance can be improved as well.

Further, in the present invention, porosity Ps of the surface side upper half of the negative electrode active material layer is made higher, compared with porosity Pc of the current collector side lower half of the negative electrode active material layer, in the thickness direction of the negative electrode active material layer.

The stress applied to the interface between the columnar particles and the current collector is large especially when the columnar particles bump against each other in the proximity of the active material layer surface, applying a great force to the columnar particles. However, by making porosity Ps higher than porosity Pc, the frequency of the bumping of the adjacent columnar particles against each other upon expansion of the columnar particles can be decreased. That is, by making porosity Ps higher than porosity Pc, the bumping of the columnar particles against each other in the proximity of the negative electrode active material layer surface can me avoided. As a result, the stress applied to the interface between the columnar particles and the current collector can be eased, and breakage of the columnar particles and the separation of the columnar particles from the current collector can be prevented. Therefore, in addition to securing current collecting ability, cycle performance can be improved.

Porosities Pc and Ps refer to a two-dimensional area proportion at a specific cross section, instead of the volume proportion in a three-dimensional space, as mentioned above. That is, the porosity is a value, represented by percentage, of a proportion of an area obtained by deducting total cross sectional area of the columnar particles C from active material layer vertical cross sectional area N, relative to the active material layer vertical cross sectional area N at an arbitrary cross section. That is, the porosity is represented by $\{(N-C)/N\} \times 100$.

Porosities Pc and Ps can be determined, for example, by obtaining an electron micrograph (for example, SEM micrograph) of a predetermined region including 5 to 10 columnar particles at a vertical cross section of the negative electrode active material layer, and then processing the image of the electron micrograph to determine the pixel count of the void portion and of the columnar particle portion for the upper half and the lower half of the active material layer. In the case where the growth direction of the one specific columnar particle is present in a plane, porosities Pc and Ps are preferably determined as in the above, at a cross section obtained by cutting the current collector and the active material layer parallel to the plane.

When the active material does not include lithium at all, porosity Ps is preferably 20%≦Ps≦70%, and further preferably 20%≦Ps≦50%. Porosity Ps of below 20% causes the bumping of the columnar particles in the proximity of the active material layer surface at the time of expanding, which gives a great force to the columnar particles, thereby causing the columnar particles to break or separate from the current collector. This leads to a decline in cycle performance. When porosity Ps is over 70%, due to the presence of surplus space over the volume ratio of the expansion at the time of charging, the energy density of the negative electrode becomes small, failing to bring out the characteristics of high capacity active material.

Porosity Pc is preferably $10\% \leq Pc \leq 60\%$, and further preferably $10\% \leq Pc \leq 40\%$. Porosity Pc of below 10% further increases the possibility for the columnar particles to bump against each other at the time of expanding, and makes decline in cycle performance notable. Porosity Pc of over 60% makes the energy density of the negative electrode small, failing to bring out the characteristics of high capacity active material.

Average porosity Pav of the entire negative electrode active material layer is preferably $15\% \leq Pav \leq 60\%$. Average porosity Pav can be expressed as $[(Ps+Pc)/2]$, the mean value of Ps and Pc. Average porosity Pav of 15% or more is considered sufficient for easing the stress due to the expansion and contraction of the columnar particles, and the electrolyte contacting the columnar particles can be secured in abundance. When average porosity Pav is over 60%, although the negative electrode can be used without a problem depending on battery usage, the energy density of the negative electrode becomes small. Also, the active material density increasingly varies depending on its portion, causing non-uniform charge and discharge reaction and decline in cycle performance.

The porosity can be controlled, for example, by adjusting the number of the bumps per unit area of the current collector, and by adjusting the angle between the growth direction of the columnar particles and the direction normal to the current collector.

The columnar particle may be made up of single crystal particles, polycrystal particles including a plurality of crystallites, particles comprising microcrystal having the crystallite size of 100 nm or less, or amorphous.

For example, in the case where the columnar particle include a plurality of portions, each portion may be made up of single crystal particles, polycrystal particles, particles comprising microcrystal, or amorphous, as mentioned in the above. The constituent element of each portion may be the same or different.

Although diameter D of the columnar particle is not particularly limited, in view of preventing cracks of the columnar particles due to the expansion while charging and separation from the current collector, diameter D of the columnar particle is preferably 100 μm or less, and particularly preferably 1 to 50 μm, in one of the case where the active material includes lithium in an amount corresponding to the irreversible capacity and the case where the active material does not include lithium in an amount corresponding to the irreversible capacity. The diameter of the columnar particle can be determined, for example, by arbitrary selecting 2 to 10 columnar particles, determining the diameter at the middle height (the diameter in the direction perpendicular to the growth direction), and obtaining the average value. The middle height refers to the half of the height from the average line for measuring the surface roughness (Rz) of the current collector to the highest position of the columnar particle.

The plurality of adjacent columnar particles sometimes are integrated in the middle of their growth. However, since each of the columnar particles has different starting point of growth, the columns are separated in the proximity of the current collector surface, and their crystal growth conditions are different. Thus, since boundaries can be observed between the individual columnar particles that is integrated, the diameter of the each columnar particle can be obtained.

The size of the columnar particle in the direction perpendicular to its growth direction is preferably the largest at the interface between the columnar particle and the current collector. In such a case, the large contact area between the current collector and the columnar particles increases the contact strength, curbing the separation of the columnar particles from the current collector. One end of the columnar particle (an end corresponding to the bottom of a columnar particle) is bonded to the current collector surface.

The size of the columnar particle preferably decreases monotonously from the interface between the active material layer and the current collector toward the active material layer surface. The size of a columnar particle in the direction perpendicular to its growth direction can be controlled, for example, by adjusting the size of the bumps of the current collector.

The columnar particles preferably are tilted so that the angle between its growth direction and the direction normal to the current collector increases, from the current collector side to the surface side of the negative electrode active material layer. The maximum angle of the angle between the direction normal to the current collector and the growth direction of the columnar particle, i.e., θs, may be 0<θs. However, to fully bring out the effect of the present invention, θs preferably satisfies $10° \leq θs \leq 90°$. As angle θs approaches 90°, it gradually becomes difficult for the current collector to carry the columnar particles. Additionally, when the portion of the columnar particle is excessively covered by other columnar particles, the effect of curbing the decline in high rate performance may be reduced. Therefore, angle θs is further preferably $10° \leq θs \leq 80°$.

When the angle between the direction normal to the current collector and the growth direction of the columnar particle is increasing, for example, from the current collector side to the surface side of the negative electrode active material layer, the angle between the growth direction of the columnar particle at the active material layer surface and the direction normal to the current collector is θs.

Minimum angle θc between the direction normal to the current collector and the growth direction of the columnar particle is preferably $0° \leq θc \leq 80°$. By setting the minimum angle between the direction normal to the current collector and the growth direction of the columnar particle in such a range, porosity Pc can be set to the predetermined range.

When, for example, the angle between the direction normal to the current collector and the growth direction of the columnar particle increases from the current collector side toward the surface side of the negative electrode active material layer, the angle between the growth direction of the columnar particle at the portion contacting the current collector and the direction normal to the current collector is θc.

Additionally, the difference between angles θs and θc is preferably 10° or more. When the angle between the growth direction of the columnar particle and the direction normal to the current collector is large, the size of the columnar particle tends to be small. Therefore, by making angle θs larger than angle θc, the size of the columnar particle at the surface side portion can be made smaller than the size of the columnar particle at the current collector side portion. Therefore, the negative electrode active material layer with porosity Pc of its lower half portion smaller than porosity Ps of its upper half portion can be formed. When the difference between angle θs and angle θc are below 10°, porosity Pc and porosity Ps become approximately equal. In this case, due to the expansion of the columnar particles at the time of charging, a possibility for the columnar particles to bump against each other in the proximity of the active material layer surface increases. Therefore, cycle performance declines.

The angle between the growth direction of the columnar particle and the direction normal to the current collector may be changed continuously or discontinuously, toward the active material layer surface. Particularly, the angle between the growth direction of the columnar particle and the direction normal to the current collector preferably increases monotonously toward the active material layer surface side. The angle between the growth direction the columnar particle and direction normal to the current collector is preferably determined, for example, as an average of the measured values for 2 to 10 columnar particles.

The growth direction of the columnar particle can be controlled, for example, by adjusting the angle of inclination between the vapor deposition surface of the current collector and the horizontal plane, in the case when the columnar particles are to be grown by vapor deposition. In this case, a target is set, for example, at a lower side vertical to the current collector.

The columnar particles may be, for example, substantially cylindrical with substantially circular cross sections or substantially prismatic with substantially rectangular cross sections, and does not have to be precisely cylindrical or prismatic.

Current collector exposure rate S is preferably 60% or less, further preferably 30% or less, and most preferably 0%. The smaller the current collector exposure rate S, the more the negative electrode active material facing the positive electrode active material layer, thereby making the area of the negative electrode current collector exposed to the positive electrode smaller. Therefore, non-uniform electrode reaction can be curbed, and cycle performance can be improved.

Also, in the case when lithium is supplemented in an amount corresponding to the irreversible capacity in the negative electrode before forming a battery, by making current collector exposure rate S small, the amount of the lithium metal remained on the current collector can be made small. Therefore, since a loss of the material can be reduced in addition to a curbed side reaction between the electrolyte and the lithium metal on the current collector, excellent battery performance can be maintained for a long period of time. The lithium in an amount of the irreversible capacity can be supplemented by sticking the lithium metal on the negative electrode, or by depositing the lithium metal with a vapor deposition method.

Center-to-center spacing W of the adjacent columnar particles is preferably 0.1 to 200 μm, and further preferably 1 to 20 μm, at the middle height of the columnar particle. Although it depends on diameter D of the columnar particle, when center-to-center spacing W is 0.1 μm or more, the effect of easing the expansion of the columnar particles can be obtained, and decline in cycle performance can be curbed. When center-to-center spacing W is 200 μm or less, a certain degree of energy density can be secured, and the area of the exposed portion of the negative electrode current collector facing the positive electrode active material layer can be decreased.

When center-to-center spacing W of the adjacent columnar particles becomes large, exposure rate S of the current collector becomes large. However, the exposure rate of the current collector, in the case when center-to-center spacing W of the adjacent columnar particles is large, becomes small relative to the exposure rate of the current collector in the case when the columnar particle stands upright parallel to the direction normal to the current collector. Thus, charge and discharge efficiency becomes relatively higher.

Thickness T of the active material layer is preferably 0.1 μm≦T≦100 μm, and particularly preferably 1 μm≦T≦50 μm, in one of the case when the active material includes lithium in an amount corresponding to the irreversible capacity and when the active material does not include lithium in an amount corresponding to the irreversible capacity, although it may depend on the diameter of the columnar particle. When thickness T of the active material layer is 0.1 μm or more, a certain degree of energy density can be secured, and high capacity performance of the lithium secondary battery can be fully brought out. When thickness T of the active material layer is 100 μm or less, in addition to curbing the coverage of each columnar particle by other columnar particles, the current collecting resistance from the columnar particles can be curbed to low. Thus, it is advantageous in charge and discharge at high rate.

Thickness T of the negative electrode active material layer can be determined as an average of the heights of the columnar particles in the direction normal to the current collector. Thickness T of the negative electrode active material layer can be determined, for example, by selecting 2 to 10 columnar particles, and obtaining the average of their heights in the direction normal to the current collector, at an arbitrary vertical cross section of the current collector and the active material layer. The height of the columnar particles refers to the height between the average line for measuring surface roughness (Rz) of the current collector, and the highest position of the columnar particles, in the direction normal to the current collector.

The parameters such as center-to-center spacing W of adjacent columnar particles, thickness T and the porosity of the active material layer, and diameter D of the columnar particle are preferably determined by using the negative electrode in the condition where lithium in an amount corresponding to the reversible capacity is not included (when the reversible capacity is zero). The measurement may be carried out with the negative electrode active material including lithium in an amount corresponding to the irreversible capacity, or may be carried out with the negative electrode active material not including lithium in an amount corresponding to the irreversible capacity. The negative electrode active material not including lithium in an amount corresponding to the reversible capacity refers to the case where the negative electrode active material layer in the assembled battery has the smallest volume. When lithium is absorbed by the columnar particles upon charging, the columnar particles expand and increase the negative electrode active material layer volume.

When the parameters are determined for one of the cases, i.e., where lithium in an amount corresponding to the irreversible capacity is included and where lithium in an amount corresponding to the irreversible capacity is not included, the parameters for the other of the cases can be determined as well by correcting the obtained values. When the porosity of the active material layer not including lithium at all is to be obtained, the porosity value is corrected by using volume difference $\Delta V$ between the volume of the active material layer including lithium in an amount corresponding to the irreversible capacity and the volume of the active material layer not including lithium at all. For example, porosity Pc of the active material layer not including lithium at all and porosity Pc' of the active material layer including lithium in an amount corresponding to the irreversible capacity satisfy the relation Pc'=Pc−$\Delta V$. This is also the case in porosities Ps and Ps'.

In the case where the active material includes lithium in an amount corresponding to the irreversible capacity, average porosity Pav' of the negative electrode active material layer is preferably $10\% \leq Pav' \leq 55\%$, and further preferably $20\% \leq Pav' \leq 50\%$.

Although the materials forming the negative electrode current collector are not particularly limited, generally, copper and copper alloys are used. A sheet-like negative electrode current collector is preferably fabricated by electrolysis. The thickness of the negative electrode current collector is not limited particularly, but for example, 1 to 50 μm in general.

The columnar particles include silicon atoms, and preferably comprise at least one selected from the group consisting of for example, a simple substance of silicon, a silicon alloy, a compound including silicon and oxygen, and a compound including silicon and nitrogen. The columnar particles may be formed solely from one of those, or may be formed from a plural kinds of materials. The active material layer may also include two or more kinds of the columnar particles having different constituent materials. Examples of such an active material layer include, the active material layer including silicon and oxygen and comprising a plurality of columnar particles having different ratios of silicon and oxygen.

Metal element M other than silicon included in the silicon alloy preferably is chemically stable, not alloyable with lithium, and electron conductive. Metal element M preferably is, for example, at least one selected from the group consisting of titanium (Ti), copper (Cu), and nickel (Ni). In the silicon alloy including metal element M, metal element M may be one kind, or may be several kinds. The mole ratio of silicon and metal element M in the silicon alloy, for example, is preferably in the range below.

When M is Ti, the relation $0<Ti/Si<2$ is preferably satisfied, and particularly, the relation $0.1 \leq Ti/Si \leq 1.0$ is satisfied preferably.

When M is Cu, the relation $0<Cu/Si<4$ is preferably satisfied, and particularly, the relation $0.1 \leq Cu/Si \leq 2.0$ is satisfied preferably.

When M is Ni, the relation $0<Ni/Si<2$ is preferably satisfied, and particularly, the relation $0.1 \leq Ni/Si \leq 1.0$ is satisfied preferably.

The compound including silicon and oxygen is preferably represented by the following formula:

$$SiO_x \text{ (where } 0<x<2\text{)} \quad (1).$$

Mole ratio x of oxygen atom relative to silicon atom is further preferably $0.01 \leq x \leq 1$.

The compound including silicon and nitrogen is preferably represented by the following formula:

$$SiN_y \text{ (where } 0<y<4/3\text{)} \quad (2).$$

Mole ratio y of nitrogen atom relative to silicon atom is further preferably $0.01 \leq x \leq 1$.

The columnar particles may be composed of a compound including silicon, oxygen, and nitrogen.

Since the present invention is characterized by the form of the negative electrode, in the lithium secondary battery of the present invention, elements other than the negative electrode are not particularly limited. For example, for the positive electrode active material, lithium-containing transition metal oxides such as lithium cobalt oxide ($LiCoO_2$), lithium nickel oxide ($LiNiO_2$), and lithium mangan oxide ($LiMn_2O_4$) may be used, but not limited thereto. The positive electrode active material layer may be formed solely of a positive electrode active material, or may be formed of a material mixture including a positive electrode active material, a binder, and a conductive agent. The positive electrode active material layer may also be formed of columnar particles as the negative electrode active material layer. For the positive electrode current collector, Al, Al alloy, Ni, and Ti may be used.

For the lithium ion-conductive electrolyte, various lithium ion conductive solid electrolyte and non-aqueous electrolyte may be used. The non-aqueous electrolyte includes, for example, a non-aqueous solvent and a lithium salt dissolved therein. The composition of the non-aqueous electrolyte is not particularly limited.

The separator and the battery case are not particularly limited as well, and the materials used for lithium secondary batteries of various forms may be used.

The above-mentioned negative electrode for lithium secondary batteries may be used for a stacked battery, as shown in FIG. 1, and may be used for cylindrical batteries and prismatic batteries including a wound-type electrode assembly as well.

In the stacked battery, a positive electrode having a positive electrode active material layer on one side or both sides thereof, and a negative electrode having a negative electrode active material layer on one side or both sides thereof may be stacked to form three or more layers of electrodes so that all of the positive electrode active material layers face the negative electrode active material layers, and all of the negative electrode active material layers face the positive electrode active material layers.

In the negative electrode, the columnar particles with different tilting directions may be included. For example, the inclination direction of the columnar particles in each negative electrode active material layer may be the same or different. In the case of the negative electrode having the negative electrode active material layers on both sides thereof, the tilting directions of the columnar particles on both sides thereof may be the same or different.

In the following, the present invention is described in detail based on Examples. However, the present invention is not limited to the Examples below.

EXAMPLE 1

A stacked lithium secondary battery as shown in FIG. 1 was prepared.

(i) Fabrication of Positive Electrode

A positive electrode material mixture paste was prepared by sufficiently mixing 10 g of lithium cobalt oxide ($LiCoO_2$) powder with an average particle size of about 10 μm, i.e., a positive electrode active material, 0.3 g of acetylene black, i.e., a conductive agent, 0.8 g of polyvinylidene fluoride powder, i.e., a binder, and an appropriate amount of N-methyl-2-pyrrolidone (NMP). The obtained paste was applied on one side of a positive electrode current collector 11a comprising an aluminum foil with a thickness of 20 μm, dried, and rolled to form a positive electrode active material layer 11b.

Afterwards, the obtained positive electrode plate was cut to give a predetermined size, to obtain a positive electrode. In the obtained positive electrode, the positive electrode active material layer carried on one side of the positive electrode current collector had a thickness of 70 μm, and a size of 30 mm×30 mm. On the reverse side of the current collector with no positive electrode active material layer, an aluminum-made positive electrode lead was connected.

(ii) Fabrication of Negative Electrode

Figure 4:
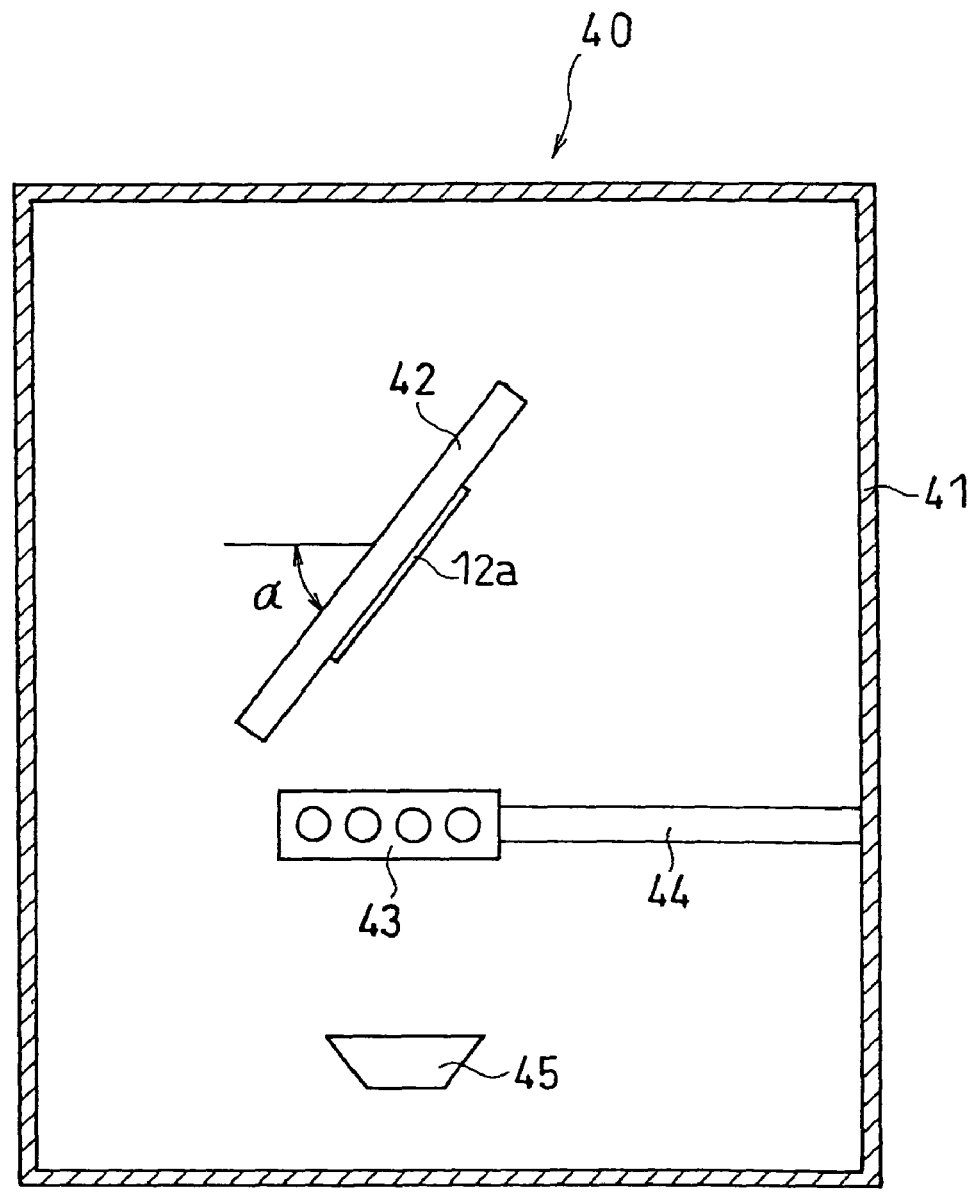
FIG. 4 is a schematic illustration of an example of a device for manufacturing a negative electrode for a lithium secondary battery.

A negative electrode 12 was fabricated by using vapor deposition device 40 (manufactured by ULVAC, Inc.) with an electron beam (EB) heater (not shown) as shown in FIG. 4. The vapor deposition device 40 includes a gas pipe 44 for introducing an oxygen gas into a chamber 41, and a nozzle 43.

The nozzle 43 was connected to the gas pipe 44 introduced in the vacuum chamber 41. The gas pipe 44 was connected to an oxygen cylinder via a mass-flow controller. An oxygen gas (manufactured by TAIYO NIPPON SANSO CORPORATION) of 99.7% purity was released from the nozzle 43 at a flow rate of 80 sccm. On the upper side of the nozzle 43, a fixing board 42 for fixing the negative electrode current collector 12a was set. On the vertical lower side of the fixing board 42, a target 45 to be deposited on the surface of the negative electrode current collector 12a was set. For the target 45, a simple substance of silicon (manufactured by Kojundo Chemical Laboratory Co., Ltd.) of 99.9999% purity was used.

On the fixing board 42, a negative electrode current collector comprising an electrolytic copper foil (manufactured by Furukawa Circuit Foil Co., Ltd.) was fixed. The thickness of the negative electrode current collector was 35 µm, the size was 40 mm×40 mm, and surface roughness Rz was 10 µm. The fixing board 42 was tilted to make angle α of 50° with the horizontal plane. Angle a between the fixing board 42 and the horizontal plane, and growth direction θ of the columnar particle substantially satisfy the relation $\tan \alpha = 2 \tan \theta$.

The acceleration voltage of the electron beam to be irradiated to the target 45, a simple substance of silicon, was set to −8 kV, and the emission was set to 500 mA. After passing through an oxygen atmosphere, a vapor of a simple substance of silicon was deposited on a copper foil set on the fixing board 42 while rotating the fixing board angle from 50° to 70° at a constant speed, to form an active material layer comprising columnar particles. The columnar particles included silicon and oxygen. The vapor deposition time was set to 22 minutes. The fixing board was rotated from 50° to 70° in 22 minutes. Thus obtained negative electrode was referred to as a negative electrode 1A.

The amount of oxygen included in the negative electrode active material was determined by combustion method. As a result, the composition of the negative electrode active material was determined to be $SiO_{0.5}$.

Figure 5:
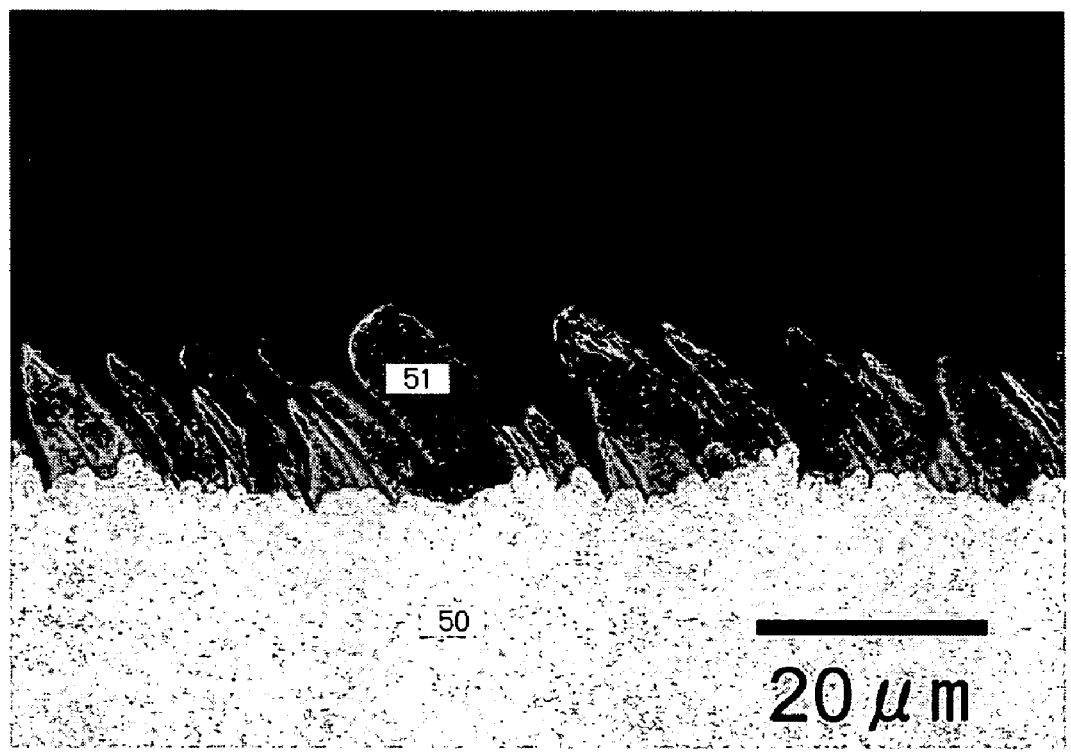
FIG. 5 is an SEM micrograph of negative electrode A1 made in Example 1, showing a cross section parallel to a growth direction of columnar particles.

The cross section of the negative electrode 1A was observed with an electron microscope, to check the angle θ between the growth direction of the columnar particles and the direction normal to the negative electrode current collector. The electron micrograph is shown in FIG. 5. FIG. 5 confirmed that active material particles 51, i.e., columnar active material, were formed on a current collector 50, and that between the direction normal to the current collector and the growth direction of the columnar particles, minimum angle θc was 30° and maximum angle θs was 60°.

Current collector exposure rate S was obtained by observing the negative electrode 1A from the direction normal to the negative electrode current collector. Current collector exposure rate S was measured by an SEM observation of the negative electrode 1A from the direction normal to the current collector, and an electron probe micro-analysis (EPMA; element mapping analysis). A square region with the side of 50 µm or more was observed, and the current collector exposure rate S was calculated as an average in the region. As a result, no exposed portion of the copper foil was observed, and current collector exposure rate S was 0%.

Porosity Pc of the lower half of the negative electrode active material layer and porosity Ps of the upper half of the negative electrode active material layer were determined by using an image processing soft to read an SEM micrograph of the vertical cross section of the negative electrode active material layer and counting pixels of the void portion and the active material portion. Active material layer area N and $SiO_{0.5}$ area C were obtained in each area, and the calculation was performed with Pc(or Ps)={(N−C)/N}×100. As a result, porosity Pc was 24%, and porosity Ps was 52%. These values were corrected by using previously obtained volume difference ΔV of the case where lithium in an amount corresponding to the irreversible capacity is included, and where lithium is not included at all. As a result, porosity Pc' was 20% and porosity Ps' was 49%.

In the negative electrode 1A, thickness T of the active material layer was 17 µm. The diameter of the columnar particles at the middle height was 7 µm. Center-to-center spacing W of adjacent columnar particles was 10 µm.

Then, by using resistance heating vapor deposition device (manufactured by ULVAC, Inc.), lithium metal was vapor deposited on the negative electrode 1A.

A predetermined amount of lithium metal was charged in a tantalum-made boat in the vapor deposition device, and the negative electrode 1A was fixed to face the boat. Current to be applied to the boat was set to 50 A, and vapor deposition of lithium was carried out for 10 minutes. By this vapor deposition, lithium in an amount corresponding to irreversible capacity reserved at the initial charge and discharge was supplemented in the negative electrode active material.

Afterwards, the negative electrode 1A was cut to give a size of 31 mm×31 mm. On the side of the current collector having no negative electrode active material layer, a nickel-made negative electrode lead was connected.

(iii) Fabrication of Battery

Between thus obtained positive electrode and negative electrode, a separator 13 comprising polyethylene microporous film and having a thickness of 20 µm (manufactured by Asahi Kasei Corporation.) was disposed, to form an electrode assembly. The positive electrode active material layer 11b and the negative electrode active material layer 12b were made to face each other, with the separator interposed therebetween.

This electrode assembly was inserted in a battery case 14 made of an aluminum laminate sheet, along with an electrolyte. For the electrolyte, a non-aqueous electrolyte in which $LiPF_6$ was dissolved in a solvent mixture of ethylene carbonate and ethyl methyl carbonate (1:1 volume ratio) with a concentration of 1.0 mol/L was used.

These were allowed to stand for a predetermined time period, for impregnating the positive electrode active material layer 11b, the negative electrode active material layer 12b, and the separator 13 with the electrolyte. Afterwards, the battery case 14 was vacuum decompressed with the positive electrode lead 15 and the negative electrode lead 16 drawn out of the case to weld the ends of the battery case 14, thereby completing a battery. Thus obtained battery is named as a battery 1A.

Comparative Example 1

A comparative negative electrode 1B was fabricated as in below.

To a current collector comprising an electrolytic copper foil and having a thickness of 35 µm and surface roughness Rz of 10 µm (manufactured by Furukawa Circuit Foil Co., Ltd.), a dry film resist (Hitachi Chemical Co., Ltd.) was laminated. The dry film resist was exposed to light by using a photo mask in which a dot with a diameter 30 µm was disposed by 10 µm space to create a dotted pattern, and then developed in a $NaHCO_3$ aqueous solution. Afterwards, the copper foil was washed with water and dried.

Afterwards, by using the vapor deposition device as shown in FIG. 4, the negative electrode active material was vapor-deposited on the current collector.

The current collector having a resist was fixed on the fixing board 42. The resist had a hole having a diameter of 30 μm disposed by 10 μm space. At this time, angle α between the fixing board and the horizontal plane was set to 0°. The acceleration voltage of the electron beam irradiated to a target 45, i.e., a simple substance of silicon, was set to −8 kV, and the emission was set to 500 mA. The vapor deposition time was set to 7 minutes. Vaporized silicon atom passed through an oxygen atmosphere, and deposited on the current collector, thereby forming an active material layer comprising a compound including silicon and oxygen on the current collector.

Then, the current collector carrying the active material layer was immersed in a sodium hydroxide aqueous solution to remove the resist and the compound attached thereto. A negative electrode 1B was thus obtained.

The oxygen amount included in the active material was determined by combustion method. As a result, the composition of the active material was determined to be $SiO_{0.5}$.

A vertical cross section of the negative electrode 1B was observed with an electron microscope. As a result, on the current collector, columnar active material particles were formed, and angle θ between the growth direction of the columnar particles and the direction normal to the current collector was 0° (that is, perpendicular to the current collector surface). Observation of the negative electrode 1B from the direction normal to the current collector confirmed an exposed portion of the current collector. Current collector exposure rate S was 49%.

The porosity of the negative electrode active material layer was determined by using an SEM micrograph of a vertical cross section of the negative electrode 1B. As a result, porosity Pc was 25%, and porosity Ps was also 25%.

In the comparative negative electrode 1B, thickness T of the active material layer was 14 μm. The center-to-center spacing W of the adjacent columnar particles was 40 μm at the middle height of the columnar particles. The diameter of the columnar particles at the middle height was 30 μm.

Then, by using a resistance heating vapor deposition device (manufactured by ULVAC, Inc.), lithium metal was vapor-deposited on the comparative negative electrode 1B in the same manner as Example 1. By this vapor deposition, lithium in an amount corresponding to irreversible capacity reserved at the initial charge and discharge was supplemented to the negative electrode active material.

A comparative battery 1B was fabricated in the same manner as Example 1, except that thus obtained comparative negative electrode 1B was used.

Comparative Example 2

Upon preparing an active material layer, angle α between the fixing board 42 and the horizontal plane was fixed to 60°, and the vapor deposition time was set to 14 minutes to form linear columnar particles on the current collector. The growth direction of the columnar particles thus formed was tilted 40° toward the direction normal to the current collector. Other than the above, a comparative negative electrode 1C was fabricated in the same manner as Example 1. A comparative battery 1C was fabricated in the same manner as Example 1, except that thus obtained comparative negative electrode 1C was used.

Properties of each negative electrode are summarized in Table 1.

TABLE 1

|  | Negative Electrode 1A | Negative Electrode 1B | Negative Electrode 1C |
|---|---|---|---|
| Composition of Active Material | $SiO_{0.5}$ | $SiO_{0.5}$ | $SiO_{0.5}$ |
| Angle θc (°) | 30 | 0 | 40 |
| Angle θs (°) | 60 | 0 | 40 |
| Porosity Pc (%) | 24 | 25 | 30 |
| Porosity Ps (%) | 52 | 25 | 30 |
| Active Material Layer Thickness T (μm) | 17 | 14 | 17 |
| Surface Roughness Rz (μm) | 10 | 10 | 10 |
| Current Collector Exposure Rate | 0 | 49 | 0 |

[Evaluation Method]

(i) Injection Time

After injecting the electrolyte in the battery case, upon decompressing the pressure in the case to 10 Torr, the time for air (gas) remained in the electrode assembly to completely evacuate was measured. The time measured was regarded as the injection time. The results are shown in Table 2.

(ii) Discharge Performance

The battery 1A, and comparative batteries 1B to 1C were individually stored in constant temperature baths of 20°, and a cycle of charge and discharge as in below was repeated 100 times.

Each battery was charged with a constant current-constant voltage method. Each battery was charged with a constant current of 1C rate (1C refers to a current value by which a whole battery capacity is completely used up by an hour), until the battery voltage reached 4.2 V. After the battery voltage reached 4.2 V, each battery was charged with a constant voltage of 4.2 V until the current value reached 0.05 C.

After allowing each battery to stand for 20 minutes, the charged battery was discharged with a high rate constant current of 1C rate, until the battery voltage dropped to 2.5 V. After the discharge with the high rate, each battery was further discharged at a constant current of 0.2 C, until the battery voltage dropped to 2.5 V. After the discharge, the batteries were allowed to stand for 20 minutes.

The ratio of the total discharge capacity (the total of the high rate discharge and re-discharge) relative to the charge capacity at the first cycle was obtained by percentage. The obtained value was regarded as charge and discharge efficiency.

The ratio of the high rate discharge capacity at the first cycle relative to the total discharge capacity at the first cycle was obtained by percentage. The obtained value was regarded as the high rate ratio.

The ratio of the total discharge capacity at 100th cycle relative to the total discharge capacity at the first cycle was obtained by percentage. The obtained value was regarded as the capacity retention rate.

The results are shown in Table 2.

TABLE 2

|  | Injection Time (sec) | Charge and Discharge Efficiency (%) | High Rate Ratio (%) | Capacity Retention Rate (%) |
| --- | --- | --- | --- | --- |
| Battery 1A | 22 | 98 | 90 | 90 |
| Battery 1B | 65 | 81 | 81 | 55 |
| Battery 1C | 22 | 98 | 90 | 70 |

Table 2 confirmed that the injection time of the battery 1A is shorter than the comparative battery 1B. The higher electrolyte penetration in the battery 1A is probably because the columnar particles of the negative electrode active material were tilted 30 to 60° with respect to the direction normal to the current collector. The tilting of the columnar particles and their long and thin growth give an orientation for moving direction of air that is present between the particles, making air to be easily released from the active material layer.

Also, the battery 1A had high charge and discharge efficiency, high rate ratio, and greatly improved capacity retention rate compared with the comparative battery 1B. The high charge and discharge efficiency and high rate ratio at the initial cycle were probably from the reasons below. (1) The tilting of the negative electrode active material columnar particles increased the negative electrode active material portion that faces the positive electrode active material layer. (2) The lithium metal vapor-deposited on the negative electrode active material was efficiently absorbed by the negative electrode active material, which completely supplemented the irreversible capacity of the negative electrode active material.

The increase in the portion of the negative electrode active material that faces the positive electrode active material layer makes charge and discharge reaction homogenous, curbing lithium deposition reaction and partial over-charge and over-discharge of the positive electrode. Therefore, the increment of the facing portion is probably advantageous for improvement in the capacity retention rate.

Although the injection time, the charge and discharge efficiency, and the high rate performance of the battery 1A are the same level as the comparative battery 1C, the capacity retention rate of the battery 1A are superior to the capacity retention rate of the comparative battery 1C. The comparative battery 1C after repeating 100 cycles of charge and discharge was disassembled, and the negative electrode was observed. As a result, a partial separation of the columnar particles and a partial exposure of the current collector were confirmed. The decline in the capacity retention rate in the comparative battery 1C was probably from the reasons below. The expansion of the columnar negative electrode active material particles causes the adjacent columnar particles to bump each other. Especially, the stress from the bumping of the columnar particles in the proximity of its surface concentrates on the interface between the current collector and the columnar particles. The capacity retention rate declined probably due to the cracks of the columnar particles or the separation of the columnar particles from the current collector.

EXAMPLE 2

Negative electrode active material layers were formed by changing surface roughness Rz of the current collector, and adjusting the vapor deposition conditions in the vapor deposition device of FIG. 4 to change porosity Pc and porosity Ps variously. Other than the above, negative electrodes 2A to 2F were fabricated in the same manner as Example 1.

<i>Negative Electrode 2A

For the current collector, an electrolytic copper foil with surface roughness Rz of 0.5 μm was used. An active material was vapor-deposited on the current collector, by setting angle α between the fixing board 42 and the horizontal plane to 36°, and the vapor deposition time to 5 minutes. Afterwards, the vapor deposition was carried out again on the active material, by setting angle α to 63°, and the vapor deposition time to 10 minutes. Other than the above, in the same manner as Example 1, a negative electrode 2A was fabricated. A battery 2A was fabricated in the same manner as Example 1, by using the negative electrode 2A.

In negative electrode 2A, the diameter of the columnar particles at their middle height was 3 μm. Center-to-center spacing W of adjacent columnar particles was 3.2 μm.

<ii>Negative Electrode 2B

For the current collector, an electrolytic copper foil with surface roughness Rz of 3 μm was used. An active material was vapor-deposited on the current collector, by setting angle α between the fixing board 42 and the horizontal plane to 36°, and the vapor deposition time to 5 minutes. Afterwards, the vapor deposition was carried out again on the active material, by setting angle α to 63°, and the vapor deposition time to 10 minutes. Other than the above, in the same manner as Example 1, a negative electrode 2B was fabricated. Battery 2B was fabricated in the same manner as Example 1, by using the negative electrode 2B.

In negative electrode 2B, the diameter of the columnar particles at their middle height was 5 μm. Center-to-center spacing W of adjacent columnar particles was 6.2 μm.

<iii>Negative Electrode 2C

For the current collector, an electrolytic copper foil with surface roughness Rz of 10 μm was used. An active material was vapor-deposited on the current collector by setting angle α between the fixing board 42 and the horizontal plane to 36°, and the vapor deposition time to 5 minutes. Afterwards, the vapor deposition was carried out again on the active material, by setting angle α to 63°, and the vapor deposition time to 10 minutes. Other than the above, in the same manner as Example 1, a negative electrode 2C was fabricated. In the negative electrode 2C, the diameter of the columnar particles at their middle height was 7 μm. Center-to-center spacing W of adjacent columnar particles was 14 μm.

A positive electrode 2C was fabricated in the same manner as the positive electrode in Example 1, except that the thickness of the positive electrode active material layer was set to 50 μm.

A battery 2C was fabricated in the same manner as Example 1, except that the negative electrode 2C and the positive electrode 2C were used.

<iv>Negative Electrode 2D

For the current collector, an electrolytic copper foil with surface roughness Rz of 20 μm was used. An active material was vapor-deposited on the current collector, by setting angle α between the fixing board 42 and the horizontal plane to 36°, and the vapor deposition time to 3 minutes. Afterwards, the vapor deposition was carried out again on the active material, by setting angle α to 63°, and the vapor deposition time to 13 minutes. Other than the above, in the same manner as Example 1, a negative electrode 2D was fabricated. In negative electrode 2D, the diameter of the columnar particles at their middle height was 6 μm. Center-to-center spacing W of adjacent columnar particles was 17 μm.

A positive electrode 2D was fabricated in the same manner as the positive electrode in Example 1, except that the thickness of the positive electrode active material layer was set to 40 μm.

A battery 2D was fabricated in the same manner as Example 1, except that the negative electrode 2D and the positive electrode 2D were used.

<v>Negative Electrode 2E

For the current collector, an electrolytic copper foil with surface roughness Rz of 30 μm was used. An active material was vapor-deposited on the current collector, by setting angle α between the fixing board 42 and the horizontal plane to 36°, and the vapor deposition time to 2 minutes. Afterwards, the vapor deposition was carried out again on the active material, by setting angle α to 63°, and the vapor deposition time to 15 minutes. Other than the above, in the same manner as Example 1, a negative electrode 2E was fabricated. In the negative electrode 2E, the diameter of the columnar particles at their middle height was 6 μm. Center-to-center spacing W of adjacent columnar particles was 19 μm.

A positive electrode 2E was fabricated in the same manner as the positive electrode in Example 1, except that the thickness of the positive electrode active material layer was set to 35 μm.

A battery 2E was fabricated in the same manner as Example 1, except that the negative electrode 2E and the positive electrode 2E were used.

Properties of the negative electrodes 2A to 2E are summarized in Table 3.

TABLE 3

|  | Negative Electrode 2A | Negative Electrode 2B | Negative Electrode 2C | Negative Electrode 2D | Negative Electrode 2E |
|---|---|---|---|---|---|
| Composition of Active Material | $SiO_{0.5}$ | $SiO_{0.5}$ | $SiO_{0.5}$ | $SiO_{0.5}$ | $SiO_{0.5}$ |
| Angle θc (°) | 20 | 20 | 20 | 20 | 20 |
| Angle θs (°) | 45 | 45 | 45 | 45 | 45 |
| Porosity Pc (%) | 5 | 10 | 40 | 60 | 65 |
| Porosity Ps (%) | 10 | 20 | 60 | 70 | 73 |
| Active Material Layer Thickness T (μm) | 17 | 17 | 17 | 17 | 17 |
| Surface Roughness Rz (μm) | 0.5 | 3 | 10 | 20 | 30 |
| Current Collector Exposure Rate (%) | 0 | 0 | 0 | 0 | 0 |

Charge and discharge efficiency, high rate ratio, and capacity retention rate of the batteries 2A to 2E were determined in the same manner as Example 1. Results are shown in Table 4.

TABLE 4

|  | Charge And Discharge Efficiency (%) | High Rate Ratio (%) | Capacity Retention Rate (%) |
|---|---|---|---|
| Battery 2A | 97 | 80 | 72 |
| Battery 2B | 98 | 88 | 85 |
| Battery 2C | 98 | 90 | 90 |

TABLE 4-continued

|  | Charge And Discharge Efficiency (%) | High Rate Ratio (%) | Capacity Retention Rate (%) |
|---|---|---|---|
| Battery 2D | 97 | 90 | 84 |
| Battery 2E | 97 | 90 | 76 |

In the battery 2A, high rate ratio and capacity retention rate were declined relatively, compared with other batteries. In the battery 2A, the decline in high rate ratio was probably because the small porosity of the negative electrode active material layer and insufficient electrolyte penetration into the negative electrode slowed the migration of lithium ions. The decline in capacity retention rate was probably because of the following. In the battery 2A, due to the small porosity in the current collector side half of the negative electrode active material layer, the space for easing the expansion of the active material could not be obtained sufficiently. Thus, the negative electrode deformed, the charge and discharge reaction became non-uniform, and the capacity retention rate declined.

Capacity retention rate declined in the battery 2E, compared with the batteries 2B to 2D. In the battery 2E, the decline in capacity retention rate was probably due to the large porosity of the active material layer, which caused the partial capacity variations in the negative electrode, and partial over-charge and over-discharge in the positive electrode. Further, in battery 2E, the presence of the unnecessary space in the negative electrode caused the low capacity per unit area compared with other batteries.

On the other hand, the batteries 2B to 2D achieved excellent results in all properties, i.e., high charge and discharge efficiency and high rate ratio, and the capacity retention rate of 84% or more. The results above confirmed that porosity Pc of the current collector side lower half of the negative electrode active material layer is preferably 10% to 60%, and porosity Ps of the surface side upper half is preferably 20% to 70%.

EXAMPLE 3

Negative electrode active material layers were formed by changing surface roughness Rz of the current collector, and adjusting the vapor deposition conditions in the vapor deposition device of FIG. 4 to variously change angles θc and θs between the direction normal to the current collector and the growth direction of the columnar particles. Other than the above, in the same manner as Example 1, negative electrodes 3A to 3E were fabricated. Also, by using the negative electrodes 3A to 3E, batteries 3A to 3E were fabricated in the same manner as Example 1. The thickness of the positive electrode active material layer was made the same as Example 1.

<i>Negative Electrode 3A

For the current collector, an electrolytic copper foil with surface roughness Rz of 30 μm was used. An active material was vapor-deposited on the current collector, by setting angle α between the fixing board 42 and the horizontal plane to 10°, and the vapor deposition time to 2 minutes. Afterwards, the vapor deposition was carried out again on the active material, by setting angle α to 20°, and the vapor deposition time to 7 minutes. Other than the above, in the same manner as Example 1, a negative electrode 3A was fabricated. A battery 3A was fabricated in the same manner as Example 1, except that the negative electrode 3A was used.

In the negative electrode 3A, the diameter of the columnar particles at their middle height was 6 μm. Center-to-center spacing W of adjacent columnar particles was 9 μm.

<ii>Negative Electrode 3B

For the current collector, an electrolytic copper foil with surface roughness Rz of 25 μm was used. An active material was vapor-deposited on the current collector, by setting angle α between the fixing board 42 and the horizontal plane to 0°, and the vapor deposition time to 2 minutes. Afterwards, the vapor deposition was carried out again on the active material, by setting angle α to 20°, and the vapor deposition time to 7 minutes. Other than the above, in the same manner as Example 1, a negative electrode 3B was fabricated. A battery 3B was fabricated in the same manner as Example 1, except that the negative electrode 3B was used.

In the negative electrode 3B, the diameter of the columnar particles at their middle height was 6 μm. Center-to-center spacing W of adjacent columnar particles was 10 μm.

<iii>Negative Electrode 3C

For the current collector, an electrolytic copper foil with surface roughness Rz of 10 μm was used. An active material was vapor-deposited on the current collector, by setting angle α between the fixing board 42 and the horizontal plane to 59°, and the vapor deposition time to 7 minutes. Afterwards, the vapor deposition was carried out again on the active material, by setting angle α to 63°, and by setting the vapor deposition time to 10 minutes. Other than the above, in the same manner as Example 1, a negative electrode 3C was fabricated. A battery 3C was fabricated in the same manner as Example 1, except that the negative electrode 3C was used.

In the negative electrode 3C, the diameter of the columnar particles at their middle height was 7 μm. Center-to-center spacing W of adjacent columnar particles was 11 μm.

<iv>Negative Electrode 3D

For the current collector, an electrolytic copper foil with surface roughness Rz of 3 μm was used. An active material was vapor-deposited on the current collector, by setting angle α between the fixing board 42 and the horizontal plane to 80°, and the vapor deposition time to 66 minutes. Afterwards, the vapor deposition was carried out again on the active material, by setting angle α to 85°, and the vapor deposition time to 340 minutes. Other than the above, in the same manner as Example 1, a negative electrode 3D was fabricated. A battery 3D was fabricated in the same manner as Example 1, except that the negative electrode 3D was used.

In negative electrode 3D, the diameter of the columnar particles at their middle height was 6 μm. Center-to-center spacing W of adjacent columnar particles was 9 μm.

<v>Negative Electrode 3E

For the current collector, an electrolytic copper foil with surface roughness Rz of 1 μm was used. An active material was vapor-deposited on the current collector, by setting angle α between the fixing board 42 and the horizontal plane to 85°, and the vapor deposition time to 340 minutes. Afterwards, the vapor deposition was carried out again on the active material, by setting angle α to 87°, and the vapor deposition time to 510 minutes. Other than the above, in the same manner as Example 1, a negative electrode 3E was fabricated. A battery 3E was fabricated in the same manner as Example 1, except that the negative electrode 3E was used.

In negative electrode 3E, the diameter of the columnar particles at their middle height was 6 μm. Center-to-center spacing W of adjacent columnar particles was 9 μm.

Properties of the negative electrodes 3A to 3E are summarized in Table 5.

TABLE 5

| | Negative Electrode 3A | Negative Electrode 3B | Negative Electrode 3C | Negative Electrode 3D | Negative Electrode 3E |
|---|---|---|---|---|---|
| Composition of Active Material | SiO$_{0.5}$ | SiO$_{0.5}$ | SiO$_{0.5}$ | SiO$_{0.5}$ | SiO$_{0.5}$ |
| Angle θc (°) | 5 | 0 | 40 | 70 | 80 |
| Angle θs (°) | 10 | 10 | 45 | 85 | 85 |
| Porosity Pc (%) | 30 | 30 | 30 | 30 | 30 |
| Porosity Ps (%) | 35 | 50 | 34 | 40 | 33 |
| Active Material Layer Thickness T (μm) | 17 | 17 | 17 | 17 | 17 |
| Surface Roughness Rz (μm) | 30 | 25 | 10 | 3 | 1 |
| Current Collector Exposure Rate (%) | 30 | 0 | 0 | 0 | 0 |

Charge and discharge efficiency, high rate ratio, and capacity retention rate of the batteries 3A to 3E were determined in the same manner as Example 1. Results are shown in Table 6.

TABLE 6

| | Charge And Discharge Efficiency (%) | High Rate Ratio (%) | Capacity Retention Rate (%) |
|---|---|---|---|
| Battery 3A | 85 | 85 | 70 |
| Battery 3B | 98 | 90 | 89 |
| Battery 3C | 96 | 90 | 72 |
| Battery 3D | 96 | 90 | 83 |
| Battery 3E | 96 | 90 | 72 |

In the battery 3A, charge and discharge efficiency, high rate ratio, and cycle capacity retention rate were relatively declined, compared with other batteries. This is probably due to the reasons below. Since the negative electrode current collector is exposed, observed from the direction normal to the current collector, upon supplementing the irreversible capacity by the vapor deposition of lithium metal, lithium metal deposits on the copper foil. The lithium metal deposited on the current collector is modified such as by oxidation before the battery assembly, thereby not contributing to the supplemental capacity. Also, the decline in the capacity retention rate is probably because of the lithium deposit reaction and the partial over-charge and over-discharge of the positive electrode.

In the batteries 3C and 3E, the capacity retention rate declined compared with the batteries 3B and 3D. In the batteries 3C and 3E, the porosity of the lower half of the negative electrode active material layer and the tilting angle of the columnar particles, and the porosity of the upper half of the negative electrode active material layer and the tilting angle of the columnar particles are about the same. Thus, adjacent columnar particles bump each other upon expansion, generating a stress at the interface between the current collector and the columnar particles, causing the cracks of the columnar particles. Therefore, current collecting ability declined and the capacity retention rate declined.

On the other hand, the batteries 3B and 3D achieved excellent results in all the properties.

The results above confirmed that θc and θs had a difference of 10° or more, and that θc and θs preferably satisfy 0°≦θc<80° and 10°≦θs<90°, respectively. Also, in Example 3, although θc and θs were changed in steps toward the surface of the active material layer, the angle of the fixing board 42 may be changed continuously to change the angle between the direction normal to the current collector and the growth direction of the columnar particles from θc to θs continuously, and the effect of the invention can be obtained.

EXAMPLE 4

Negative electrodes 4A to 4D were fabricated in the same manner as Example 1, except that the vapor deposition time of silicon atom was changed, and thickness T of the active material layer was changed. Also, batteries 4A to 4D were fabricated in the same manner as Example 1, except that the negative electrodes 4A to 4D were used, and the thickness of the positive electrode active material layer was changed.

<i>Negative Electrode 4A

For the current collector, an electrolytic copper foil with surface roughness Rz of 8 μm was used. An active material was vapor-deposited on the current collector, by setting the emission of the electron beam to 300 mA, angle α between the fixing board 42 and the horizontal plane to 36°, and the vapor deposition time to 16 seconds. Afterwards, the vapor deposition was carried out again on the active material, by setting angle α to 63° and the vapor deposition time to 42 seconds. Other than the above, in the same manner as Example 1, a negative electrode 4A was fabricated.

In the negative electrode 4A, the diameter of the columnar particles at their middle height was 3 μm. Center-to-center spacing W of adjacent columnar particles was 5 μm.

A positive electrode was prepared as in below, by using an RF magnetron sputtering device.

For the positive electrode current collector, a stainless steel foil with a thickness of 20 μm (SUS304) was used. For the target, LiCoO$_2$ with a diameter of 4 inches and a thickness of 5 mm was used. Argon gas was introduced into a vacuum chamber with a flow rate of 100 sccm, and the pressure in the chamber showed 20 m Torr. A sputtering was carried out for 10 minutes by setting the output of a high frequency power source to 100 W. Afterwards, the positive electrode current collector with a LiCoO$_2$ thin film formed was sintered by using a baking furnace, in air, at 500° C., for 5 hours to form a positive electrode active material layer with a thickness of 120 nm on the positive electrode current collector. The positive electrode active material layer was analyzed with inductively coupled plasma spectrometry (ICP spectrometry) and an oxygen analysis. As a result, the mole ratio of Li, Co, and oxygen included in the positive electrode active material was 1:1:2. Thus obtained positive electrode is referred to as a positive electrode 4A.

A battery 4A was fabricated in the same manner as Example 1, except that the negative electrode 4A and the positive electrode 4A were used.

<ii>Negative Electrode 4B

For the current collector, an electrolytic copper foil with surface roughness Rz of 8 μm was used. An active material was vapor-deposited on the current collector, by setting the emission of the electron beam to 400 mA, angle α between the fixing board 42 and the horizontal plane to 36°, and the vapor deposition time to 22 minutes. Afterwards, the vapor deposition was carried out again on the active material, by setting angle α to 63° and the vapor deposition time to 56 minutes. Other than the above, in the same manner as Example 1, a negative electrode 4B was fabricated.

In the negative electrode 4B, the diameter of the columnar particles at their middle height was 10 μm. Center-to-center spacing W of adjacent columnar particles was 16 μm.

A positive electrode 4B was fabricated in the same manner as the positive electrode in Example 1, except that the thickness of the positive electrode active material layer was set to 98 μm.

A battery 4B was fabricated in the same manner as Example 1, except that the negative electrode 4B and the positive electrode 4B were used.

<iii>Negative Electrode 4C

For the current collector, an electrolytic copper foil with surface roughness Rz of 8 μm was used. An active material was vapor-deposited on the current collector, by setting the emission of an electron beam to 400 mA, angle α between the fixing board 42 and the horizontal plane to 36°, and the vapor deposition time to 27 minutes. Afterwards, the vapor deposition was carried out again on the active material, by setting angle α to 63° and the vapor deposition time to 71 minutes. Other than the above, in the same manner as Example 1, a negative electrode 4C was fabricated.

In the negative electrode 4C, the diameter of the columnar particles at their middle height was 13 μm. Center-to-center spacing W of adjacent columnar particles was 22 μm.

A positive electrode 4C was fabricated in the same manner as the positive electrode of Example 1, except that the thickness of the positive electrode active material layer was changed to 123 μm.

A battery 4C was fabricated in the same manner as Example 1, except that the negative electrode 4C and the positive electrode 4C were used.

<iv>Negative Electrode 4D

For the current collector, an electrolytic copper foil with surface roughness Rz of 8 μm was used. An active material was vapor-deposited on the current collector, by setting the emission of an electron beam to 400 mA, angle α between the fixing board 42 and the horizontal plane to 36°, and the vapor deposition time to 32 minutes. Afterwards, the vapor deposition was carried out again on the active material, by setting angle α to 63° and the vapor deposition time to 85 minutes. Other than the above, in the same manner as Example 1, a negative electrode 4D was fabricated.

In the negative electrode 4D, the diameter of the columnar particles at their middle height was 15 μm. Center-to-center spacing W of adjacent columnar particles was 25 μm.

A positive electrode 4D was fabricated in the same manner as the positive electrode of Example 1, except that the thickness of the positive electrode active material layer was changed to 147 μm.

A battery 4D was fabricated in the same manner as Example 1, except that the negative electrode 4D and the positive electrode 4D were used.

Properties of the negative electrodes 4A to 4D are summarized in Table 7.

TABLE 7

|  | Negative Electrode 4A | Negative Electrode 4B | Negative Electrode 4C | Negative Electrode 4D |
|---|---|---|---|---|
| Composition of Active Material | $SiO_{0.5}$ | $SiO_{0.5}$ | $SiO_{0.5}$ | $SiO_{0.5}$ |
| Angle θc (°) | 20 | 20 | 20 | 20 |
| Angle θs (°) | 45 | 45 | 45 | 45 |
| Porosity Pc (%) | 30 | 30 | 30 | 30 |
| Porosity Ps (%) | 50 | 50 | 50 | 50 |
| Active Material Layer Thickness T (μm) | 0.1 | 80 | 100 | 120 |
| Surface Roughness Rz (μm) | 8 | 8 | 8 | 8 |
| Current Collector Exposure Rate (%) | 0 | 0 | 0 | 0 |

Charge and discharge efficiency, high rate ratio, and capacity retention rate of the batteries 4A to 4D were determined in the same manner as Example 1. Results are shown in Table 8.

TABLE 8

|  | Charge And Discharge Efficiency (%) | High Rate Ratio (%) | Capacity Retention Rate (%) |
|---|---|---|---|
| Battery 4A | 98 | 95 | 93 |
| Battery 4B | 98 | 88 | 82 |
| Battery 4C | 98 | 86 | 73 |
| Battery 4D | 98 | 85 | 69 |

The results in Table 8 show that capacity retention rate tends to decline as thickness T of the negative electrode active material layer is increased. Also, in the battery 4D, capacity retention rate declined relatively, compared with other batteries. When the columnar negative electrode active material particles become longer, the contact area of the negative electrode current collector and the active material particles becomes small relatively, thereby increasing the resistance. The increased resistance causes non-uniform charge and discharge reaction, which probably caused the decline in capacity retention rate.

The results of the battery 4A showed that even with the active material layer thickness of 0.1 μm, there was no problems in charge and discharge efficiency, high rate ratio, and capacity retention rate. However, the small capacity per unit area would probably limit the practical use.

From these results, the preferable range of the active material layer thickness is 0.1 μm to 100 μm.

EXAMPLE 5

Upon forming the negative electrode active material layer, the ratio of silicon and oxygen was changed by adjusting the vapor deposition conditions, and thickness T of the negative electrode active material layer was changed by adjusting the vapor deposition time. Other than the above, negative electrodes 5A to 5G were fabricated in the same manner as Example 1. Also, by using the negative electrodes 5A to 5G, batteries 5A to 5G were fabricated in the same manner as Example 1. The thickness of the positive electrode active material layer was made the same as Example 1.

<i>Negative Electrode 5A

For the current collector, an electrolytic copper foil with surface roughness Rz of 8 μm was used. An active material was vapor-deposited on the current collector, by setting the flow rate of oxygen gas to 0 sccm, angle α between the fixing board 42 and the horizontal plane to 36°, and the vapor deposition time to 3 minutes. Afterwards, the vapor deposition was carried out again on the active material, by setting angle α to 63° and the vapor deposition time to 6 minutes. Other than the above, in the same manner as Example 1, a negative electrode 5A was fabricated. The oxygen amount included in the active material of the negative electrode 5A was determined by combustion method. As a result, the oxygen content was 1% or less.

In negative electrode 5A, the diameter of the columnar particles at their middle height was 6 μm. Center-to-center spacing W of adjacent columnar particles was 10 μm.

<ii>Negative Electrode 5B

For the current collector, an electrolytic copper foil with surface roughness Rz of 8 μm was used. An active material was vapor-deposited on the current collector, by setting the flow rate of oxygen gas to 16 sccm, angle α between the fixing board 42 and the horizontal plane to 36°, and the vapor deposition time to 3 minutes. Afterwards, the vapor deposition was carried out again on the active material, by setting angle α to 63° and the vapor deposition time to 6 minutes. Other than the above, in the same manner as Example 1, a negative electrode 5B was fabricated. The oxygen amount included in the active material of the negative electrode 5B was determined by combustion method. As a result, the composition of the active material was determined to be $SiO_{0.1}$.

In the negative electrode 5B, the diameter of the columnar particles at their middle height was 6 μm. Center-to-center spacing W of adjacent columnar particles was 10 μm.

<iii>Negative Electrode 5C

For the current collector, an electrolytic copper foil with surface roughness Rz of 8 μm was used. An active material was vapor-deposited on the current collector, by setting the flow rate of oxygen gas to 32 sccm, angle α between the fixing board 42 and the horizontal plane to 36°, and the vapor deposition time to 4 minutes. Afterwards, the vapor deposition was carried out again on the active material, by setting angle α to 63° and the vapor deposition time to 7 minutes. Other than the above, in the same manner as Example 1, a negative electrode 5C was fabricated. The oxygen amount included in the active material of the negative electrode 5C was determined by combustion method. As a result, the composition of the active material was determined to be $SiO_{0.2}$.

In the negative electrode 5C, the diameter of the columnar particles at their middle height was 6 μm. Center-to-center spacing W of adjacent columnar particles was 10 μm.

<iv>Negative Electrode 5D

For the current collector, an electrolytic copper foil with surface roughness Rz of 8 μm was used. An active material was vapor-deposited on the current collector, by setting the flow rate of oxygen gas to 48 sccm, angle α between the fixing board 42 and the horizontal plane to 36°, and the vapor deposition time to 4 minutes. Afterwards, the vapor deposition was carried out again on the active material, by setting angle α to 63° and the vapor deposition time to 9 minutes. Other than the above, in the same manner as Example 1, a negative electrode 5D was fabricated. The oxygen amount included in the active material of the negative electrode 5D was determined by combustion method. As a result, the composition of the active material was determined to be $SiO_{0.3}$. In the negative electrode 5D, the diameter of the columnar particles at their middle height was 7 μm. Center-to-center spacing W of adjacent columnar particles was 11 μm.

<v>Negative Electrode 5E

For the current collector, an electrolytic copper foil with surface roughness Rz of 8 μm was used. An active material was vapor-deposited on the current collector, by setting the flow rate of oxygen gas to 64 sccm, angle α between the fixing board 42 and the horizontal plane to 36°, and the vapor deposition time to 5 minutes. Afterwards, the vapor deposition was carried out again on the active material, by setting angle α to 63° and the vapor deposition time to 10 minutes. Other than the above, in the same manner as Example 1, a negative electrode 5E was fabricated. The oxygen amount included in the active material of the negative electrode 5E was determined by combustion method. As a result, the composition of the active material was determined to be $SiO_{0.4}$.

In the negative electrode 5E, the diameter of the columnar particles at their middle height was 7 μm. Center-to-center spacing W of adjacent columnar particles was 11 μm.

<vi>Negative Electrode 5F

For the current collector, an electrolytic copper foil with surface roughness Rz of 8 μm was used. An active material was vapor-deposited on the current collector, by setting the flow rate of oxygen gas to 160 sccm, angle α between the fixing board 42 and the horizontal plane to 36°, and the vapor deposition time to 8 minutes. Afterwards, the vapor deposition was carried out again on the active material, by setting angle α to 63° and the vapor deposition time to 17 minutes. Other than the above, in the same manner as Example 1, a negative electrode 5F was fabricated. The oxygen amount included in the active material of the negative electrode 5F was determined by combustion method. As a result, the composition of the active material was determined to be $SiO_{1.0}$.

In the negative electrode 5F, the diameter of the columnar particles at their middle height was 6 μm. Center-to-center spacing W of adjacent columnar particles was 10 μm.

<vii>Negative Electrode 5G

For the current collector, an electrolytic copper foil with surface roughness Rz of 8 μm was used. For the target 45, a bulk silicon dioxide (manufactured by Kojundo Chemical Laboratory Co., Ltd.) was used. An active material was vapor-deposited on the current collector, by setting the flow rate of oxygen gas to 20 sccm, the emission of the electron beam to 500 mA, angle α between the fixing board 42 and the horizontal plane to 36°, and the vapor deposition time to 5 minutes. Afterwards, the vapor deposition was carried out again on the active material, by setting angle α to 63° and the vapor deposition time to 10 minutes. Other than the above, in the same manner as Example 1, a negative electrode 5G was fabricated. The oxygen amount included in the active material of the negative electrode 5G was determined by combustion method. As a result, the composition of the active material was determined to be $SiO_{2.0}$.

In the negative electrode 5G, the diameter of the columnar particles at their middle height was 6 μm. Center-to-center spacing W of adjacent columnar particles was 10 μm.

Properties of the negative electrodes 5A to 5G are summarized in Table 9. Active material layer thickness T was changed to make the capacity of the negative electrodes 5A to 5G almost the same.

TABLE 9

|  | Negative Electrode 5A | Negative Electrode 5B | Negative Electrode 5C | Negative Electrode 5D | Negative Electrode 5E | Negative Electrode 5F | Negative Electrode 5G |
|---|---|---|---|---|---|---|---|
| Composition of Active Material | Si | $SiO_{0.1}$ | $SiO_{0.2}$ | $SiO_{0.3}$ | $SiO_{0.4}$ | $SiO_{1.0}$ | $SiO_{2.0}$ |
| Angle $\theta c$ (°) | 20 | 20 | 20 | 20 | 20 | 20 | 20 |
| Angle $\theta s$ (°) | 45 | 45 | 45 | 45 | 45 | 45 | 45 |
| Porosity Pc (%) | 30 | 30 | 30 | 30 | 30 | 30 | 30 |
| Porosity Ps (%) | 50 | 50 | 50 | 50 | 50 | 50 | 50 |
| Active Material Layer Thickness T (μm) | 10 | 11 | 13 | 15 | 17 | 30 | 17 |
| Surface Roughness Rz (μm) | 8 | 8 | 8 | 8 | 8 | 8 | 8 |
| Current Collector Exposure Rate (%) | 0 | 0 | 0 | 0 | 0 | 0 | 0 |

Charge and discharge efficiency, high rate ratio, and capacity retention rate of the batteries 5A to 5G were determined in the same manner as Example 1. Results are shown in Table 10.

TABLE 10

|  | Charge And Discharge Efficiency (%) | High Rate Ratio (%) | Capacity Retention Rate (%) |
|---|---|---|---|
| Battery 5A | 98 | 88 | 69 |
| Battery 5B | 98 | 89 | 76 |
| Battery 5C | 98 | 90 | 80 |
| Battery 5D | 98 | 90 | 84 |
| Battery 5E | 98 | 90 | 90 |
| Battery 5F | 98 | 90 | 93 |
| Battery 5G | — | — | — |

In the battery 5G, no capacity was obtained, and all the test could not be carried out in the charge and discharge test.

The results of the batteries 5A to 5F showed that the higher the oxygen ratio in the negative electrode active material, the more the capacity retention rate improved. This is probably because the lower oxygen ratio in the negative electrode active material caused the expansion ratio of the active material at the time of charging to increase. On the other hand, the higher the oxygen ratio in the negative electrode active material, with the low expansion rate of the active material at the time of charging, even though the active material particles expanded, the stress from the particles bumping each other at the active material layer surface side is eased. Thus, breakage and separation of the columnar particles were curbed, securing the current collecting ability.

Therefore, when the oxygen ratio in the negative electrode active material is low, by growing the active material under the conditions where porosity Pc and porosity Ps satisfy the relation Pc<Ps and both porosity Pc and porosity Ps are high, excellent negative electrode, which is less influenced by the stress from the active material expansion, can be obtained.

EXAMPLE 6

Negative electrodes 6A to 6B were fabricated in the same manner as Example 1, except that a silicon alloy containing metal element M was used for the negative electrode active material. Batteries 6A to 6B were fabricated in the same manner as Example 1, except that the negative electrodes 6A to 6B were used. For metal element M included in the silicon alloy other than silicon, Ti or Cu which does not form an alloy with lithium was used.

<i>Negative Electrode 6A

For the target 45, a mixture of Si powder (manufactured by Kojundo Chemical Laboratory Co., Ltd.) and TiSi$_2$ powder (Si : TiSi$_2$=3:1 (mole ratio)) was used. An active material was vapor-deposited on the current collector, by setting the flow rate of oxygen gas to 0 sccm, angle α between the fixing board 42 and the horizontal plane to 36°, and the vapor deposition time to 5 minutes. Afterwards, the vapor deposition was carried out again on the active material, by setting angle α to 63° and the vapor deposition time to 11 minutes. Other than the above, in the same manner as Example 1, a negative electrode 6A was fabricated. The amount of the element included in the active material of the negative electrode 6A was determined by X-ray fluorescence spectroscopy. As a result, the composition of the active material was $SiTi_{0.2}$.

In the negative electrode 6A, the diameter of the columnar particles at their middle height was 6 μm. Center-to-center spacing W of adjacent columnar particles was 10 μm.

<ii>Negative Electrode 6B

For the target 45, a mixture of Si powder (manufactured by Kojundo Chemical Laboratory Co., Ltd.) and Cu powder (Si : Cu=5:1 (mole ratio)) was used. An active material was vapor-deposited on the current collector, by setting the flow rate of oxygen gas to 0 sccm, angle α between the fixing board 42 and the horizontal plane was set to 36°, and the vapor deposition time to 5 minutes. Afterwards, vapor deposition was carried out again on the active material, by setting angle α to 63° and the vapor deposition time to 11 minutes. Other than the above, a negative electrode 6B was fabricated in the same manner as Example 1. The amount of the element included in the active material of the negative electrode 6B was determined by X-ray fluorescence spectroscopy. As a result, the composition of the active material was $SiCu_{0.2}$.

In the negative electrode 6B, the diameter of the columnar particles at their middle height was 6 μm. Center-to-center spacing W of adjacent columnar particles was 10 μm.

Negative electrodes 6C to 6D were fabricated in the same manner as Example 1, except that a compound including silicon and nitrogen was used as the negative electrode active material. Batteries 6C to 6D were fabricated in the same manner as Example 1, except that the negative electrodes 6C to 6D were used.

<iii>Negative Electrode 6C

For the target 45, single crystal silicon (manufactured by Kojundo Chemical Laboratory Co., Ltd.) was used. Nitrogen gas was introduced to the chamber instead of oxygen gas. The acceleration voltage of the electron beam that was irradiated to the target 45 was set to −8 kV, and the emission was set to 300 mA. An active material was vapor-deposited on the current collector by setting angle α between the fixing board 42 and the horizontal plane to 36°, and the vapor deposition time to 19 minutes. Afterwards, the vapor deposition was carried out again on the active material, by setting angle α to 63° and the vapor deposition time to 40 minutes. Other than the above, in the same manner as Example 1, a negative electrode 6C was fabricated.

For nitrogen gas, nitrogen gas of 99.7% purity (TAIYO NIPPON SANSO CORPORATION) was used. The flow rate of nitrogen was set to 20 sccm. In the proximity of the nozzle 43, an electron beam irradiation device was set, to form a nitrogen gas plasma. In the electron beam irradiation device, the acceleration voltage of the electron beam was set to −4 kV, and the emission of the electron beam was set to 20 mA.

The amount of the element included in the active material of the negative electrode 6C was determined by X-ray fluorescence spectroscopy. As a result, the composition of the active material was $SiN_{0.2}$.

In negative electrode 6C, the diameter of the columnar particles at their middle height was 6 μm. Center-to-center spacing W of adjacent columnar particles was 10 μm.

<iv>Negative Electrode 6D

For the target 45, single crystal silicon (manufactured by Kojundo Chemical Laboratory Co., Ltd.) was used. Nitrogen gas was introduced into the chamber along with oxygen gas. The acceleration voltage of the electron beam irradiated to the target 45 was set to −8 kV, and the emission was set to 300 mA. An active material was vapor-deposited on the current collector, by setting angle α between the fixing board 42 and the horizontal plane to 36°, and the vapor deposition time to 22 minutes. Afterwards, the vapor deposition was carried out again on the active material, by setting angle α to 63° and the vapor deposition time to 46 minutes. Other than the above, in the same manner as Example 1, a negative electrode 6D was fabricated.

For oxygen gas, oxygen gas of 99.7% purity (manufactured by TAIYO NIPPON SANSO CORPORATION) was used, and for nitrogen gas, nitrogen gas of 99.7% purity (manufactured by TAIYO NIPPON SANSO CORPORATION) was used. The flow rate of oxygen gas was set to 10 sccm, and the flow rate of nitrogen gas was set to 10 sccm. In the proximity of the nozzle 32, an electron beam irradiation device was set, to form an oxygen gas plasma and a nitrogen gas plasma. In the electron beam irradiation device, the acceleration voltage of the electron beam was set to −4 kV, and the emission of the electron beam was set to 20 mA.

The amount of the element included in the active material of the negative electrode 6D was determined by X-ray fluorescence spectroscopy. As a result, the composition of the active material was $SiO_{0.1}N_{0.1}$.

In the negative electrode 6D, the diameter of the columnar particles at their middle height was 6 μm. Center-to-center spacing W of adjacent columnar particles was 10 μm.

Properties of the negative electrodes 6A to 6D are summarized in Table 11.

TABLE 11

|  | Negative Electrode 6A | Negative Electrode 6B | Negative Electrode 6C | Negative Electrode 6D |
| --- | --- | --- | --- | --- |
| Composition of Active Material | $SiTi_{0.2}$ | $SiCu_{0.2}$ | $SiN_{0.2}$ | $SiN_{0.1}O_{0.1}$ |
| Angle θc (°) | 20 | 20 | 20 | 20 |
| Angle θs (°) | 45 | 45 | 45 | 45 |
| Porosity Pc (%) | 30 | 30 | 30 | 30 |
| Porosity Ps (%) | 50 | 50 | 50 | 50 |

TABLE 11-continued

|  | Negative Electrode 6A | Negative Electrode 6B | Negative Electrode 6C | Negative Electrode 6D |
|---|---|---|---|---|
| Active Material Layer Thickness T (μm) | 13 | 13 | 14 | 16 |
| Surface Roughness Rz (μm) | 8 | 8 | 8 | 8 |
| Current Collector Exposure Rate (%) | 0 | 0 | 0 | 0 |

Charge and discharge efficiency, high rate ratio, and capacity retention rate of the batteries 6A to 6D were determined in the same manner as Example 1. Results are shown in Table 12.

TABLE 12

|  | Charge and Discharge Efficiency (%) | High Rate Ratio (%) | Capacity Retention Rate (%) |
|---|---|---|---|
| Battery 6A | 98 | 88 | 81 |
| Battery 6B | 98 | 84 | 82 |
| Battery 6C | 98 | 90 | 86 |
| Battery 6D | 98 | 89 | 89 |

The results in the battery 6A confirmed that even though the alloy including silicon and titanium was used for the negative electrode active material, the effects of the present invention can be obtained. Also, the results in the battery 6B confirmed that even the alloy including silicon and copper was used for the negative electrode active material, the effects of the present invention can be obtained.

The results in the battery 6C confirmed that even though the compound including silicon and nitrogen was used for the negative electrode active material, the effect of the present invention can be obtained. Also, the results in the battery 6D confirmed that even though the compound including silicon, nitrogen, and oxygen was used for the negative electrode active material, the effects of the present invention can be obtained.

Based on the present invention, particularly, a high capacity lithium secondary battery excellent in cycle performance can be provided. A lithium secondary battery of the present invention can be used for, for example, a power source for personal data assistants, mobile electronic devices, household small electricity storage device, motorcycle, electric car, and Hybrid Electric Vehicle.

The form of the lithium secondary battery of the present invention is not particularly limited, and for example, can be any of the coin-form, button form, sheet-form, cylindrical-form, flat-form, and rectangular form. The form of the electrode assembly included in the lithium secondary battery of the present invention may be wound-type, and stacked-type. The size of the battery may be small, for small mobile devices, or large, for electric car.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium secondary battery, comprising a sheet-like current collector and an active material layer being carried on said current collector and including a silicon atom,
    wherein said active material layer comprises a plurality of columnar particles,
    each of said columnar particles is grown to tilt in one direction with respect to a direction normal to said current collector, and
    in a thickness direction of said active material layer, porosity Pc of a current collector side lower half of said active material layer and porosity Ps of a surface side upper half of said active material layer satisfy the relation, Pc<Ps, wherein the porosity Pc is an areal ratio of a void portion present at a lower half relative to the total area of said lower half and porosity Ps is an areal ratio of a void portion present at an upper half relative to the total area of said upper half, in a cross-section of said active material layer,
    an angle θ between a growth direction of said columnar particles and said direction normal to said current collector is increasing from a current collector-side to an active material layer surface-side, and
    a maximum angle θs and a minimum value θc of said angle θ satisfy the relation below:

$10°\leq θs-θc, 0°\leq θc<80°$, and $10°\leq θs<90°$.

2. The negative electrode for a lithium secondary battery in accordance with claim 1, wherein porosity Pc is 10 to 60% and porosity Ps is 20 to 70%.

3. The negative electrode for a lithium secondary battery in accordance with claim 1, wherein said active material layer includes at least one selected from the group consisting of a simple substance of silicon, an alloy including silicon, a compound including silicon and oxygen, and a compound including silicon and nitrogen.

4. The negative electrode for a lithium secondary battery in accordance with claim 3, wherein said active material mixture is an alloy of silicon and metal element M, and metal element M includes an alloy including silicon that does not form an alloy with lithium.

5. The negative electrode for a lithium secondary battery in accordance with claim 4, wherein metal element M is at least one selected from the group consisting of titanium, copper, and nickel.

6. The negative electrode for a lithium secondary battery in accordance with claim 3, wherein said active material layer is represented by the following formula (1):

$$SiO_x \qquad (1)$$

where 0<x<2.

7. A lithium secondary battery comprising: a positive electrode capable of absorbing and desorbing lithium ions, a negative electrode in accordance with claim 1, a separator disposed between said positive electrode and said negative electrode, and a lithium ion-conductive electrolyte.

8. The negative electrode for a lithium secondary battery in accordance with claim 1 which satisfies a formula:

$S(\%)=100\times\{(A-B)/A\}<60$, wherein said negative electrode for a lithium secondary battery is observed from the top, and where A is an area of an entire region where said active material layer is formed and B is an area of a region where said active material layer observed is present.

* * * * *